US011029728B1

(12) United States Patent
Piper et al.

(10) Patent No.: US 11,029,728 B1
(45) Date of Patent: Jun. 8, 2021

(54) CASE FOR PORTABLE ELECTRONIC COMPUTING DEVICE

(71) Applicant: Pioneer Square Brands, Inc., Seattle, WA (US)

(72) Inventors: Brian Lewis Piper, Seattle, WA (US); Michael Cooper Ferren, Camus, WA (US)

(73) Assignee: PIONEER SQUARE BRANDS, INC., McLean, VA (US)

( * ) Notice: Subject to any disclaimer, the term of this patent is extended or adjusted under 35 U.S.C. 154(b) by 0 days.

(21) Appl. No.: 17/202,316

(22) Filed: Mar. 15, 2021

(51) Int. Cl.
*G06F 1/16* (2006.01)

(52) U.S. Cl.
CPC .......... *G06F 1/1628* (2013.01); *G06F 1/1626* (2013.01); *G06F 2200/1633* (2013.01)

(58) Field of Classification Search
CPC combination set(s) only.
See application file for complete search history.

(56) References Cited

U.S. PATENT DOCUMENTS

| | | | | |
|---|---|---|---|---|
| 7,907,394 | B2 * | 3/2011 | Richardson | G06F 1/1613 361/679.3 |
| 8,644,011 | B2 * | 2/2014 | Parkinson | G06F 1/1626 361/679.09 |
| 10,054,983 | B2 * | 8/2018 | Daley | G06F 1/1628 |
| 10,896,559 | B2 * | 1/2021 | Werner | G06F 3/0488 |
| 2011/0240448 | A1 * | 10/2011 | Springer | F16M 11/041 200/331 |
| 2012/0212896 | A1 * | 8/2012 | Schulz | G06F 1/1628 361/679.02 |
| 2012/0262618 | A1 * | 10/2012 | Weakly | A45C 11/22 348/333.01 |
| 2017/0025873 | A1 * | 1/2017 | Fathollahi | H04M 1/0274 |

* cited by examiner

Primary Examiner — Lisa Lea-Edmonds
(74) Attorney, Agent, or Firm — Grandview Law

(57) ABSTRACT

Systems and methods are involved with a frame including first wall and third wall, door panel portion, and shelf panel portion, wherein door panel positionable to be removably couplable to at least one coupling area of first wall and at least one coupling area of the third wall wherein as door panel being in at least one coupled position, the door panel being coupled to the at least one coupling area of the first wall being and coupled to the at least one coupling area of the third wall, wherein as the door panel being in at least one uncoupled position, the door panel being uncoupled from the at least one coupling area of the first wall and from the at least one coupling area of the third wall. In addition, other aspects are described in the claims, drawings, and text forming a part of the present disclosure.

20 Claims, 28 Drawing Sheets

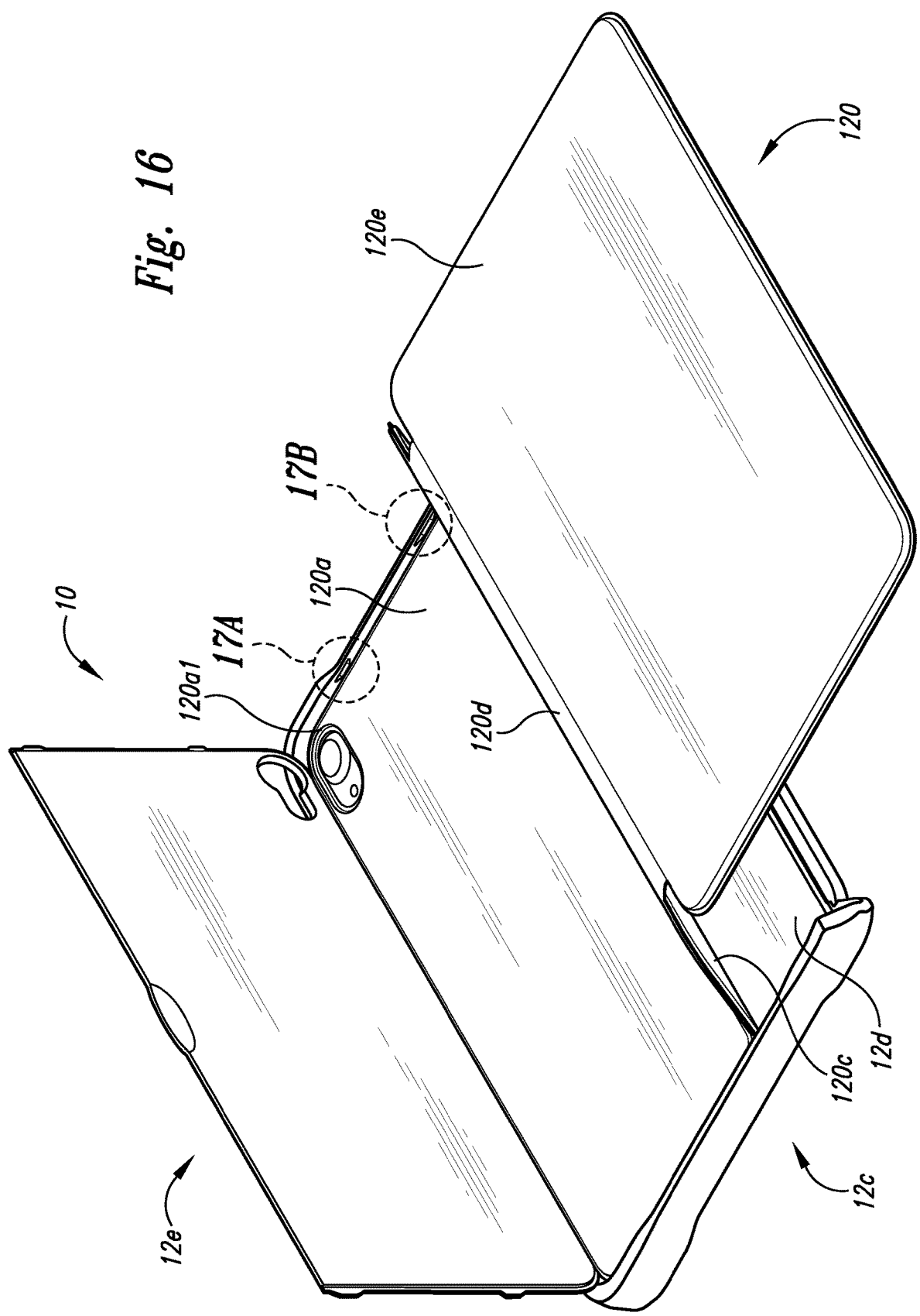

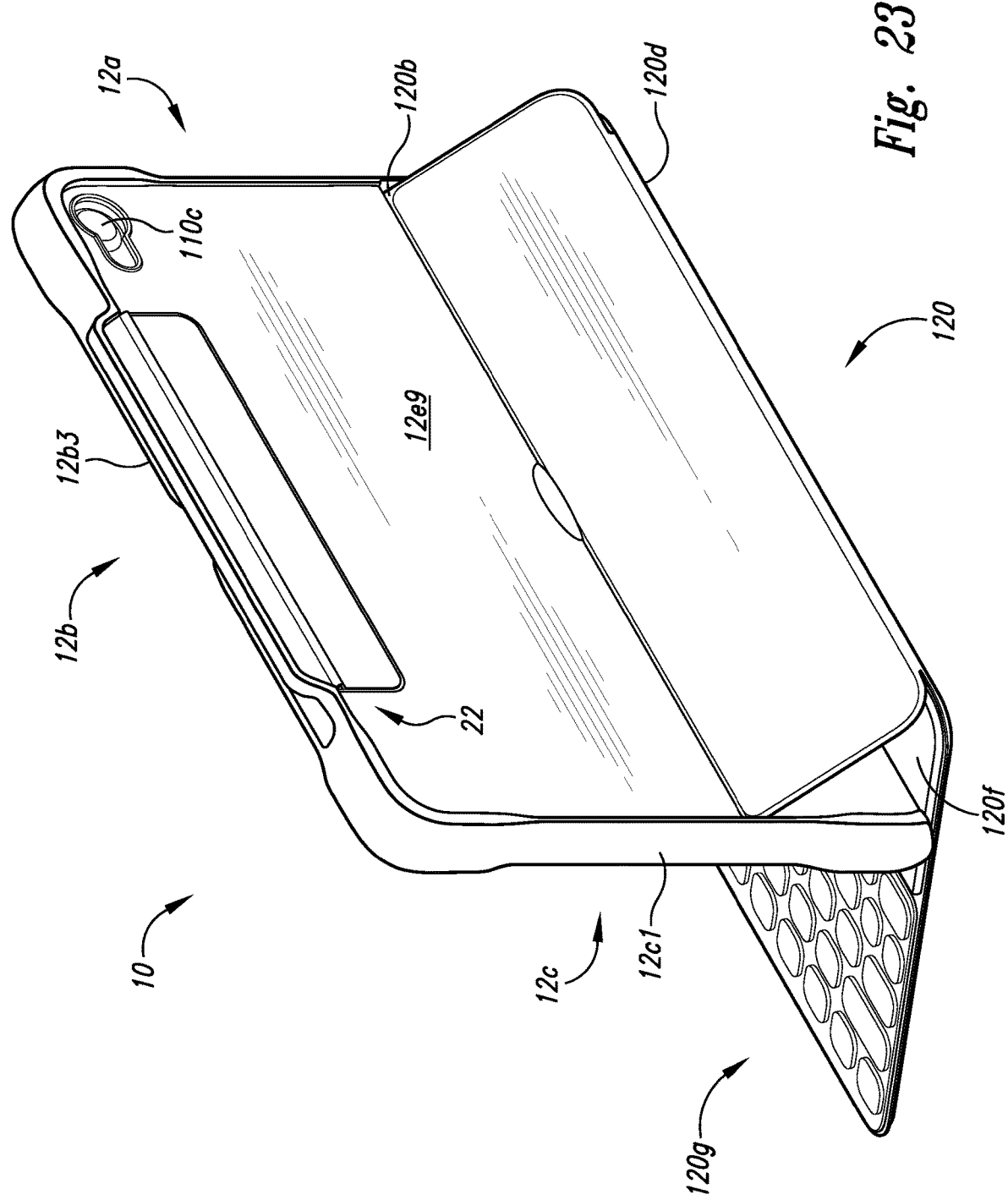

CASE FOR PORTABLE ELECTRONIC COMPUTING DEVICE

SUMMARY

In one or more aspects, an apparatus can include, but is not limited to (I) a frame including (A) a first wall including a first length, (B) a second wall including a second length, and (C) a third wall including a third length, (i) the first wall extending along the first length of the first wall parallel to the third length of the third wall, (ii) the first wall extending along the first length of the first wall perpendicularly to the second length of the second wall, (iii) the first wall including (a) at least one coupling area, (b) a door panel portion with a door panel length, and (c) a shelf panel portion with a shelf panel length, (iv) the third wall including (a) at least one coupling area, (b) a door panel portion with a door panel length and (c) a shelf panel portion with a shelf panel length; (II) a door panel including (A) an interior surface and (B) an exterior surface, (i) the door panel (a) positionable to be removably couplable to the at least one coupling area of the first wall of the frame and (b) positionable to be removably couplable to the at least one coupling area of the third wall of the frame (c) wherein as the door panel being in at least one coupled position, the door panel being coupled to the at least one coupling area of the first wall of the frame and being coupled to the at least one coupling area of the third wall of the frame, and (d) wherein as the door panel being in at least one uncoupled position, the door panel being uncoupled from the at least one coupling area of the first wall of the frame and being uncoupled from the at least one coupling area of the third wall of the frame, (ii) as the door panel being in the at least one coupled position, the door panel positioned to extend alongside of the door panel length of the door panel portion of the first wall and to extend alongside of the door panel length of the door panel portion of the third wall, (iii) as the door panel being in the at least one coupled position, the door panel portion of the first wall extending perpendicularly to the interior surface of the door panel in a first direction, and and the door panel portion of the third wall extending perpendicularly to the interior surface of the door panel in a first direction, (iv) as the door panel being in the at least one coupled position, the door panel portion of the first wall extending perpendicularly to the exterior surface of the door panel in a second direction, and the door panel portion of the third wall extending perpendicularly to the exterior surface of the door panel in a second direction, the first direction being opposite of the second direction; and (III) a shelf panel including (A) an interior surface and (B) an exterior surface, (i) the shelf panel coupled to the shelf panel portion of the first wall of the frame, (ii) the shelf panel coupled to the shelf panel portion of the third wall of the frame, (iii) the shelf panel portion of the first wall extending perpendicularly to the interior surface of the shelf panel in the first direction, (iv) the shelf panel portion of the third wall extending perpendicularly to the interior surface of the shelf panel in the first direction, (v) the shelf panel portion of the first wall extending perpendicularly to the interior surface of the shelf panel in the first direction, and (vi) the shelf panel portion of the third wall extending perpendicularly to the exterior surface of the shelf panel in the second direction. The door panel can be in the at least one coupled position, the second wall extending perpendicularly to the interior surface of the door panel in the first direction and the second wall extending perpendicularly to the exterior surface of the door panel in the second direction. The apparatus can further include but is not limited to a hinge assembly, the hinge assembly including a frame attachment, a door panel attachment, and a flexible portion, the frame attachment coupled to the second wall of the frame, the door panel attachment coupled to the exterior surface of the door panel, and the flexible portion extending between the frame attachment and the door panel attachment. The hinge assembly can include a hinge length, the hinge length of the hinge assembly being at least one-half the second length of the second wall. The flexible portion of the hinge assembly can be foldable and flattenable to allow for desired positioning of the door panel. The apparatus can further include, but is not limited to at least one first rib extending along the first length of the first wall, at least one second rib extending along the second length of the second wall, and at least one third rib extending along the third length of the third wall. The door panel can include a plurality of tabs, as the door panel being in the at least one coupled position, at least one of the plurality of tabs, being coupled to the at least one coupling area of the first wall and at least one of the plurality of tabs, being coupled to the at least one coupling area of the third wall. The at least one coupling area of the first wall can include at least one pair of first and second notches positioned on the door panel portion of the first wall, the first notch being spaced from the second notch along the second direction and wherein the at least one coupling area of the third wall includes at least one pair of first and second notches positioned on the door panel portion of the third wall, the first notch being spaced from the second notch along the second direction. The door panel can include a plurality of tabs, and the second wall includes at least one coupling area, as the door panel being in the at least one coupled position, at least one of the plurality of tabs, being coupled to the at least one coupling area of the second wall. The at least one coupling area of the second wall can include at least one pair of first and second notches positioned on the door panel portion of the second wall, the first notch being spaced from the second notch along the second direction. The apparatus can further include, but is not limited to a flexible portion and wherein the door panel is hingedly coupled to the second wall by the flexible portion. The at least one coupled position of the door panel includes a first position wherein the door panel being coupled to the first wall and the third wall with the interior surface of the door panel being parallel with the interior surface of the shelf panel and includes a second position with the door panel coupled to the first wall and the third wall with the interior surface of the door panel being parallel with the interior surface of the shelf panel, the first position of the door panel being spaced from the second position of the door panel along the second direction. The apparatus can further include, but not limited to a flexible hinge and wherein the door panel is hingedly coupled to the second wall by the flexible hinge. The first position the interior surface of the door panel can be in the same plane as the interior surface of the shelf panel and in the second position the interior surface of the door panel can be in a plane different than the plane of the interior surface of the shelf panel. The shelf panel length of the shelf panel portion of the third wall can be less than one-half of the door panel length of the door panel portion of the third wall. The first wall and the third wall can include a plurality of tabs, a first portion of the plurality of tabs extending over the interior surface of the shelf panel and a second portion of the plurality of tabs extending over the interior surface of the door panel as the door panel is in the at least one coupled position.

In one or more aspects an apparatus can include, but is not limited to (I) a frame including (A) a first wall including a first length, (B) a second wall including a second length, and (C) a third wall including a third length, (i) the first wall extending along the first length of the first wall parallel to the third length of the third wall, (ii) the first wall extending along the first length of the first wall perpendicularly to the second length of the second wall, (iii) the first wall including at least (a) one coupling area, (b) a door panel portion with a door panel length, and (c) a shelf panel portion with a shelf panel length, (iv) the third wall including (a) at least one coupling area, (b) a door panel portion with a door panel length, and (c) a shelf panel portion with a shelf panel length; (II) a door panel including (A) an interior surface and (B) an exterior surface, (i) the door panel (a) positionable to be removably couplable to the at least one coupling area of the first wall of the frame and (b) positionable to be removably couplable to the at least one coupling area of the third wall of the frame, (III) a shelf panel including (A) an interior surface and (B) an exterior surface, (i) the shelf panel coupled to the shelf panel portion of the first wall of the frame, (ii) the shelf panel coupled to the shelf panel portion of the third wall of the frame, (iii) the shelf panel portion of the first wall and the shelf panel portion of the third wall extending perpendicularly to the interior surface of the shelf panel in a first direction, and (iv) the shelf panel portion of the first wall and the shelf panel portion of the third wall extending perpendicularly to the exterior surface of the shelf panel in a second direction, (v) the first direction being opposite of the second direction; and (IV) a hinge assembly including (A) a frame attachment, (B) a door panel attachment, and (C) a flexible portion, (i) the frame attachment coupled to the second wall of the frame, (ii) the door panel attachment coupled to the exterior surface of the door panel, and (iii) the flexible portion extending between the frame attachment and the door panel attachment, and (iv) the flexible portion configured to provide adjustment of the door panel between at least a first position and a second position of the door panel wherein the exterior surface of the door panel is parallel to the exterior surface of shelf panel in both the first position and the second position of the exterior surface, and the exterior surface of the door panel is in different locations along the second direction as the door panel is in the first position and the second position. The door panel can be positioned to be couplable with the at least one coupling area of the first wall of the frame and can be couplable with the at least one coupling area of the third wall of the frame as the door panel is in the first position and as the door panel is in the second position.

In one or more aspects an apparatus can include, but is not limited to (I) a frame including (A) a first wall including a first length, (B) a second wall including a second length, and (C) a third wall including a third length, (i) the first wall extending along the first length of the first wall parallel to the third length of the third wall, (ii) the first wall extending along the first length of the first wall perpendicularly to the second length of the second wall, (iii) the first wall including at least (a) one coupling area, (b) a door panel portion with a door panel length, and (c) a shelf panel portion with a shelf panel length, (iv) the third wall including (a) at least one coupling area, (b) a door panel portion with a door panel length, and (c) a shelf panel portion with a shelf panel length; (II) a door panel including (A) an interior surface and (B) an exterior surface, (i) the door panel (a) positionable to be removably couplable to the at least one coupling area of the first wall of the frame and (b) removably couplable to the at least one coupling area of the third wall of the frame, (III) a shelf panel including (A) an interior surface and (B) an exterior surface, (i) the shelf panel coupled to the shelf panel portion of the first wall of the frame, (ii) the shelf panel coupled to the shelf panel portion of the third wall of the frame, (iii) the shelf panel portion of the first wall and the shelf panel portion of the third wall extending perpendicularly to the interior surface of the shelf panel in a first direction, and (iv) the shelf panel portion of the first wall and the shelf panel portion of the third wall extending perpendicularly to the exterior surface of the shelf panel in a second direction, (v) the first direction being opposite of the second direction; and (IV) a flexible portion flexibly coupling the door panel to the second wall of the frame to provide adjustment of the door panel between at least a first position and a second position of the door panel wherein the exterior surface of the door panel being parallel to the exterior surface of shelf panel in both the first position and the second position of the door panel, and wherein the exterior surface of the door panel is in different locations along the second direction in the first position and the second position of the door panel. The door panel can be positioned to be couplable with the at least one coupling area of the first wall of the frame and to be couplable with the at least one coupling area of the third wall of the frame as the door panel being in the first position and as the door panel being in the second position.

In addition to the foregoing, other aspects are described in the claims, drawings, and text forming a part of the disclosure set forth herein. Various other aspects are set forth and described in the teachings such as text (e.g., claims and/or detailed description) and/or drawings of the present disclosure. The foregoing is a summary and thus may contain simplifications, generalizations, inclusions, and/or omissions of detail; consequently, those skilled in the art will appreciate that the summary is illustrative only and is NOT intended to be in any way limiting. Other aspects, features, and advantages of the devices and/or processes and/or other subject matter described herein will become apparent in the teachings set forth herein.

BRIEF DESCRIPTION OF THE FIGURES

For a more complete understanding of implementations, reference now is made to the following descriptions taken in connection with the accompanying drawings. The use of the same symbols in different drawings typically indicates similar or identical items, unless context dictates otherwise.

With reference now to the figures, shown are one or more examples of an accessory coupling system articles of manufacture, compositions of matter, systems for producing and/or methods for producing same that may provide context, for instance, in introducing one or more processes and/or devices described herein.

FIG. 16 is a rear perspective view of the case assembly of FIG. 3 with the door panel in a fully open position with a tablet computer being contained by the case assembly and a keyboard folio coupled with the tablet computer.

FIG. 23 is a second rear perspective view of the case assembly of FIG. 3 with the door panel in a closed position with a tablet computer being contained by the case assembly and a keyboard folio in a second position coupled with the tablet computer.

DETAILED DESCRIPTION

Figure 1:
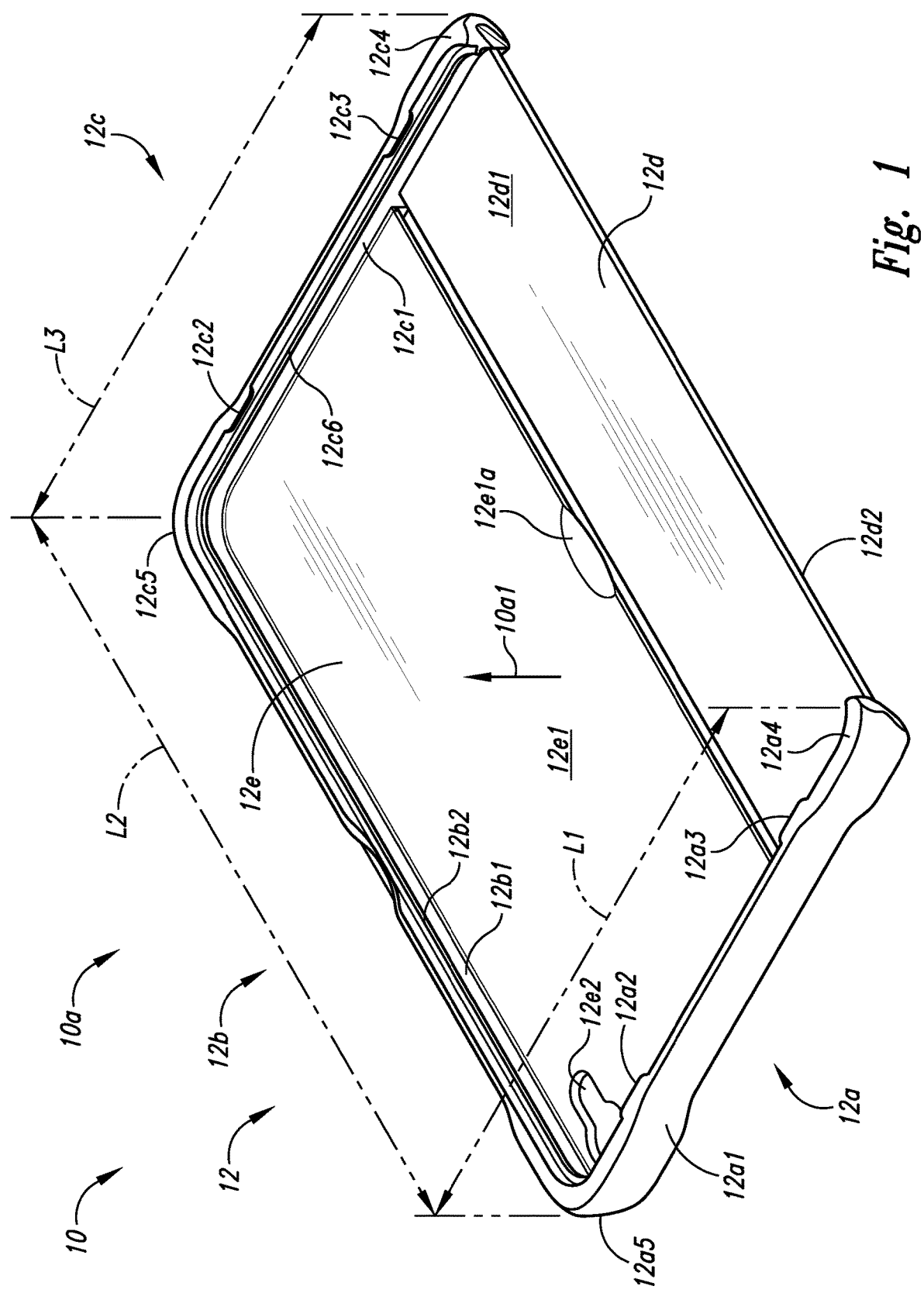
FIG. 1 is a front perspective view a case assembly for a portable electronic computing device shown with its door panel in a closed position.

In the following detailed description, reference is made to the accompanying drawings, which form a part hereof. In the drawings, similar symbols typically identify similar components, unless context dictates otherwise. The illustrative implementations described in the detailed description, drawings, and claims are not meant to be limiting. Other implementations may be utilized, and other changes may be made, without departing from the spirit or scope of the subject matter presented here.

Turning to FIG. 1, depicted therein is a front perspective view a case assembly 10 shown to include front opening 10*a* having a first direction 10*a*1 and a frame 12. The frame 12 shown to include first side 12*a*, second side 12*b*, and third side 12*c*. The first side 12*a* is shown to include first wall 12*a*1 with first length L1. The first wall 12*a*1 is shown to include tab 12*a*2, tab 12*a*3, extended end surface 12*a*4, and corner surface 12*a*5. The second side 12*b* is shown to include second wall 12*b*1 with second length L2. The second wall 12*b*1 is shown to include second rib 12*b*2 extending along second length L2. The third side 12*c* is shown to include third wall 12*c*1 with third length L3. The third wall 12*c*1 is shown to include tab 12*c*2, tab 12*c*3, extended end surface 12*c*4, corner surface 12*c*5, and third rib 12*c*6 extending along third length L3. The case assembly 10 is further shown to include shelf panel 12*d* and door panel 12*e*. The shelf panel 12*d* is shown to include interior surface 12*d*1 and edge 12*d*2. Depicted in a closed position, the door panel 12*e* is shown to include interior surface 12*e*1, interior grip surface 12*e*1*a*, and aperture 12*e*2. The case assembly 10 can be constructed from one or more combinations of case materials such as combinations of polycarbonate, silicone, other hard or soft plastics, rubberized materials, cloth materials, mechanical hinges, etc.

Figure 2:
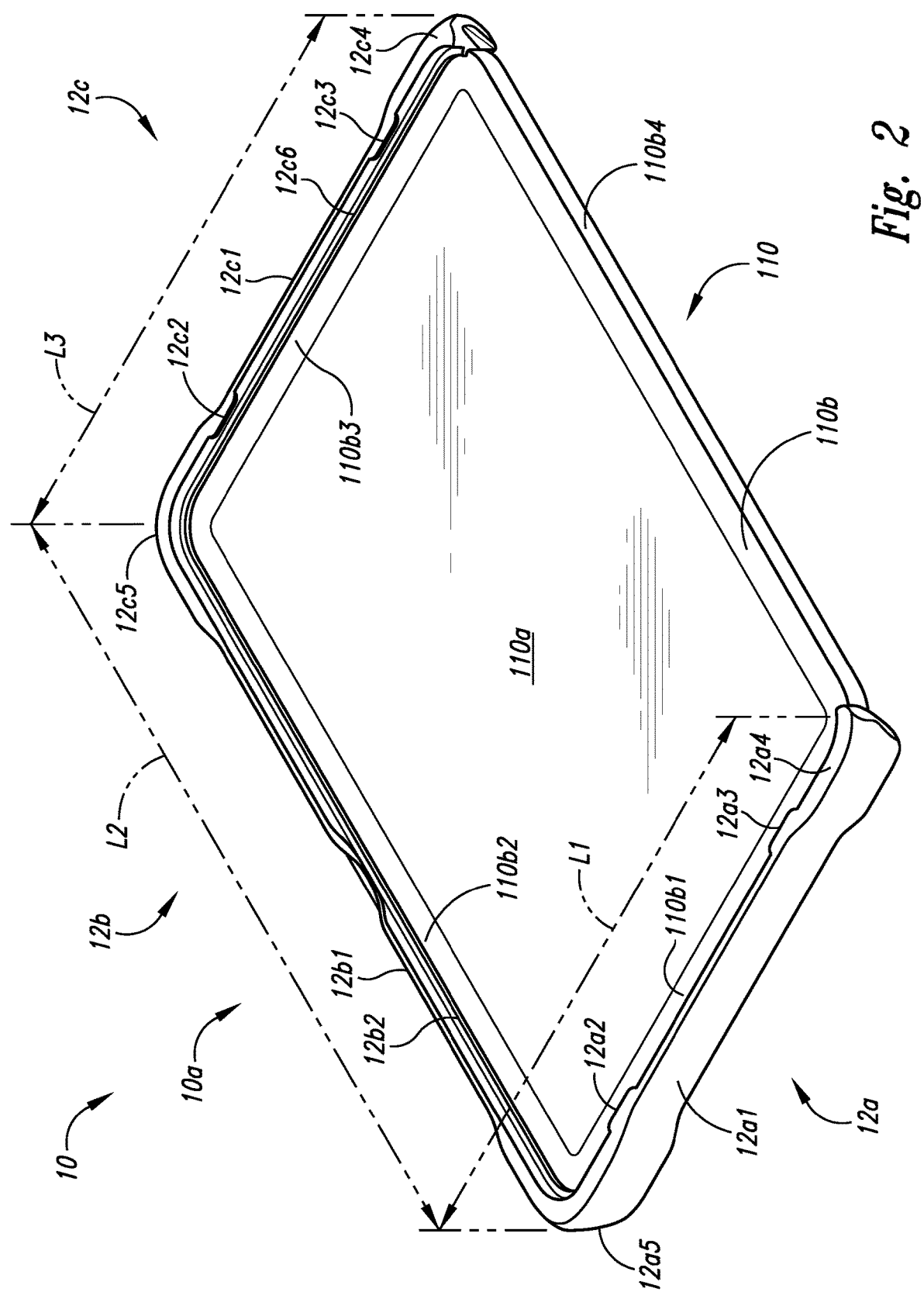
FIG. 2 is a front perspective view of the case assembly of FIG. 1 with a tablet computer being contained by the case assembly.

Turning to FIG. 2, depicted therein is a front perspective view of the case assembly 10 of FIG. 1 with a tablet computer 110 being contained by the case assembly 10. The tablet computer 110 is shown to include display 110a, and frame 110b. The frame 110b is shown to include first side 110b1, second side 110b2, third side 110b3, and fourth side 110b4.

Figure 3:
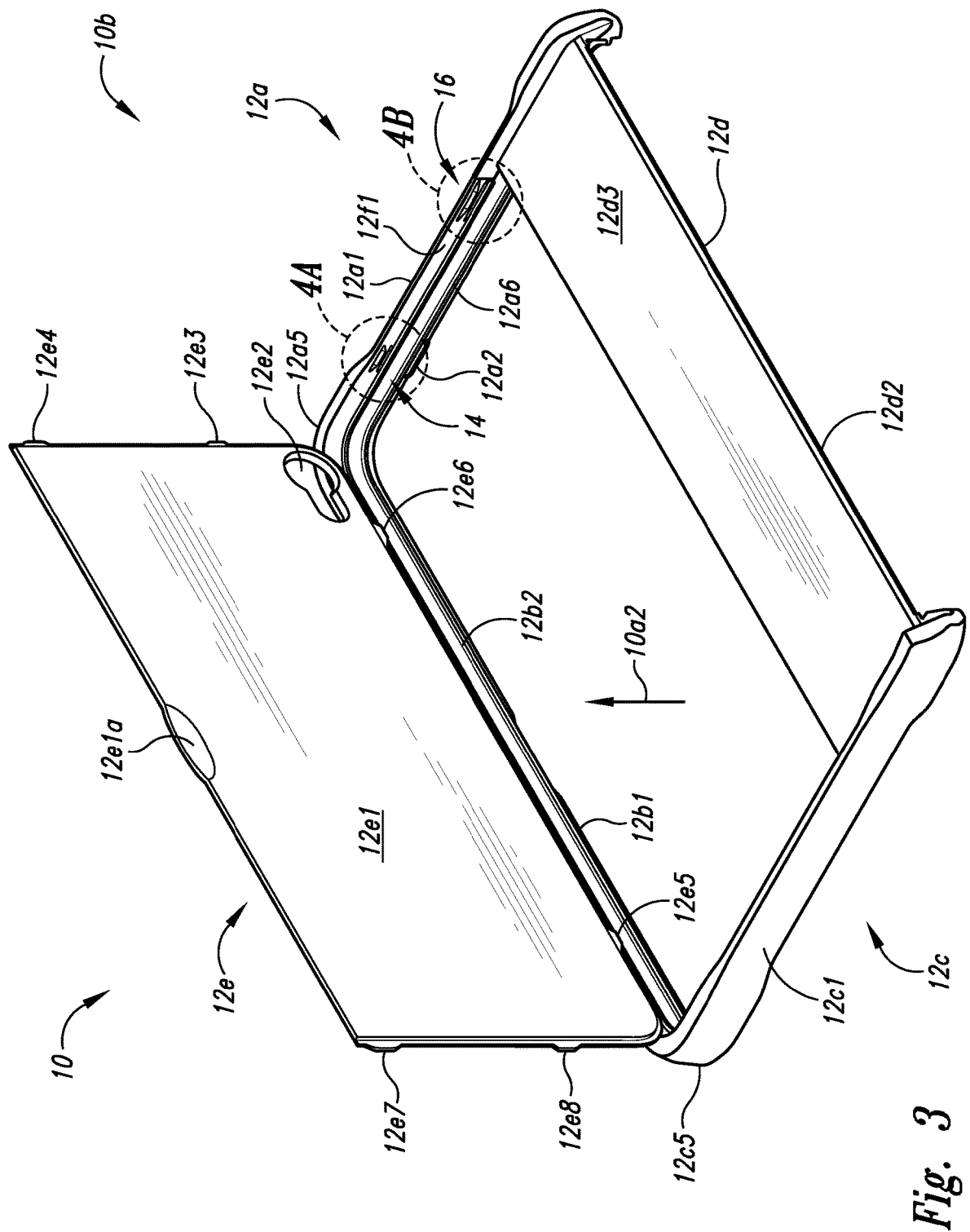
FIG. 3 is a rear perspective view of the case assembly of FIG. 1 with the door panel in a fully open position.

Turning to FIG. 3, depicted therein is a rear perspective view of the case assembly 10 of FIG. 1 with the door panel 12e in a fully open position. The case assembly 10 is shown to include rear opening 10b with second direction 10a2. The first wall 12a1 is shown to include first rib 12a6 extending along first length L1. The shelf panel 12d is shown to include an exterior surface 12d3. The door panel 12e is shown to include first tab 12e3, second tab 12e4, third tab 12e5, fourth tab 12e6, fifth tab 12e7, and sixth tab 12e8. The first wall 12a1 is shown to include interior surface 12f1, first notch set 14, and second notch set 16.

Figure 4B:
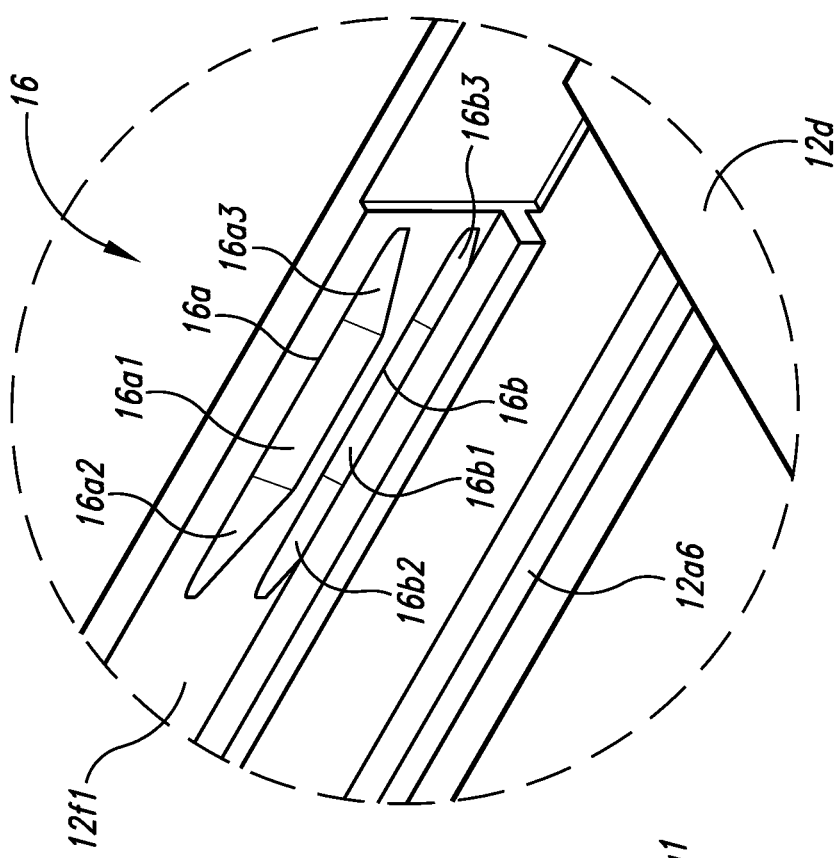
FIG. 4B is an enlarged perspective view of the dashed-circle portion labeled "4B" of the case assembly shown in FIG. 3.
Figure 4A:
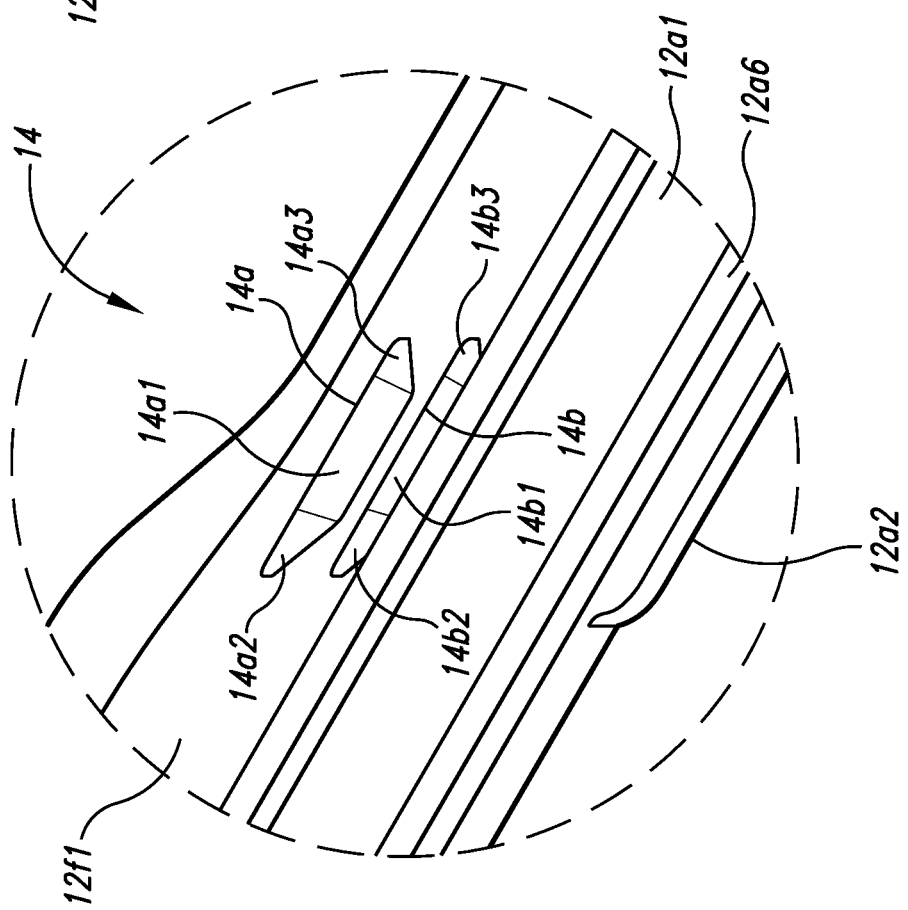
FIG. 4A is an enlarged perspective view of the dashed-circle portion labeled "4A" of the case assembly shown in FIG. 3.

Turning to FIG. 4A, depicted therein is an enlarged perspective view of the dashed-circle portion labeled "4A" of the case assembly 10 shown in FIG. 3. The first notch set 14 is shown to include upper notch 14a and lower notch 14b. The upper notch 14a is shown to include a center portion 14a1, a first lateral portion 14a2, and a second lateral portion 14a3. The lower notch 14b is shown to include a center portion 14b1, a first lateral portion 14b2, and a second lateral portion 14b3.

Turning to FIG. 4B, depicted therein is an enlarged perspective view of the dashed-circle portion labeled "4B" of the case assembly 10 shown in FIG. 3. The second notch set 16 is shown to include upper notch 16a and lower notch 16b. The upper notch 16a is shown to include center portion 16a1, first lateral portion 16a2, and second lateral portion 16a3. The lower notch 16b is shown to include center portion 16b1, first lateral portion 16b2, and second lateral portion 16b3.

Figure 5:
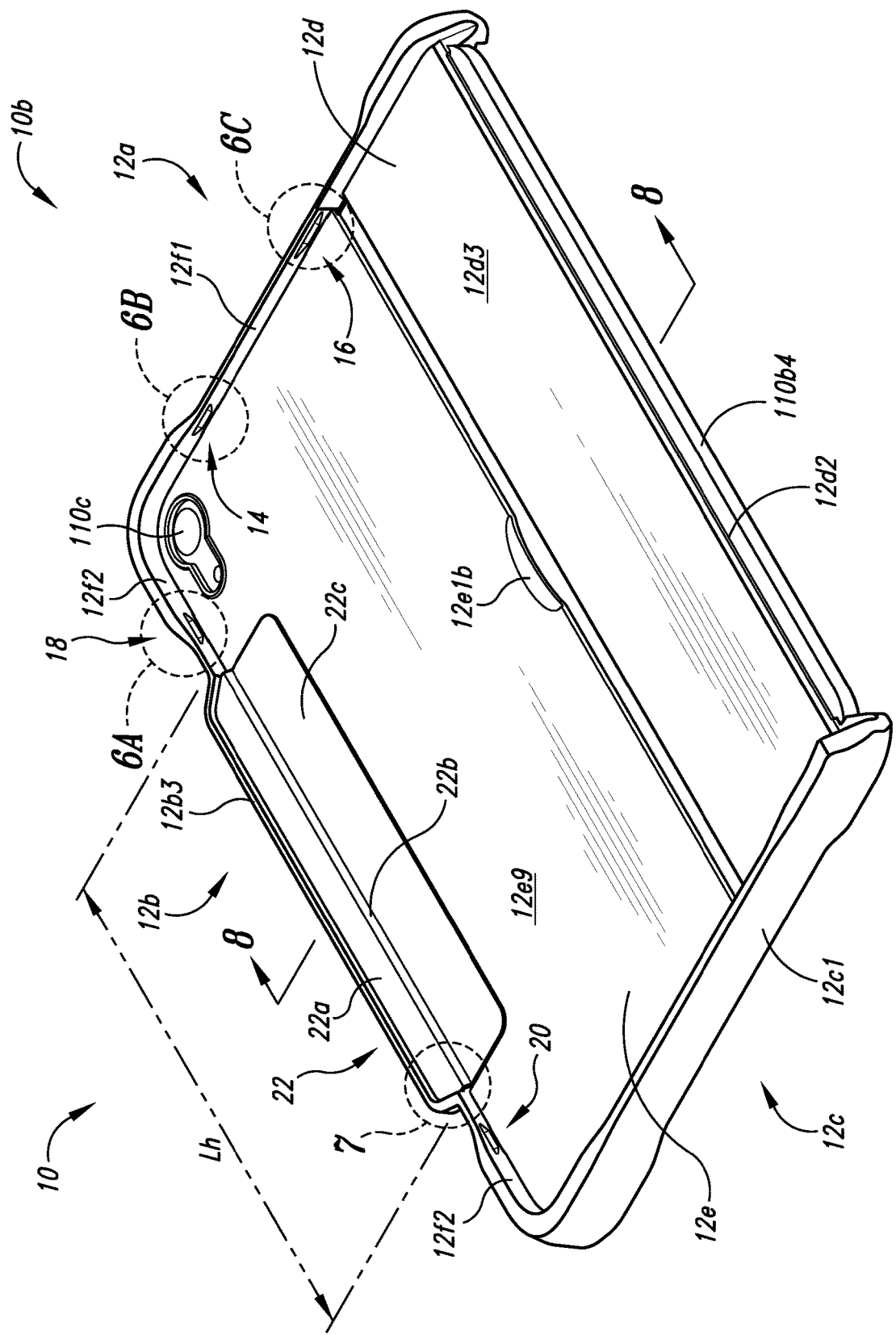
FIG. 5 is a rear perspective view of the case assembly of FIG. 3 with the door panel in a closed position with a tablet computer being contained by the case assembly.

Turning to FIG. 5, depicted therein is a rear perspective view of the case assembly 10 of FIG. 3 with the door panel 12e in a closed position with tablet computer 110 being contained by the case assembly 10. The second wall 12b1 of frame 12 is shown to include frame support 12b3, interior surface 12f2 with third notch set 18 and fourth notch set 20. The door panel 12e is shown to include exterior grip surface 12e1b, and exterior surface 12e9. The case assembly 10 is shown to include hinge assembly 22 having hinge length Lh and including frame attachment 22a coupled with frame support 12b3, flexible portion 22b (e.g., made from fabric material or a mechanical rotating hinge), and door panel attachment 22c coupled with door panel 12e. The tablet computer 110 is shown to include camera 110c.

Figure 6B:
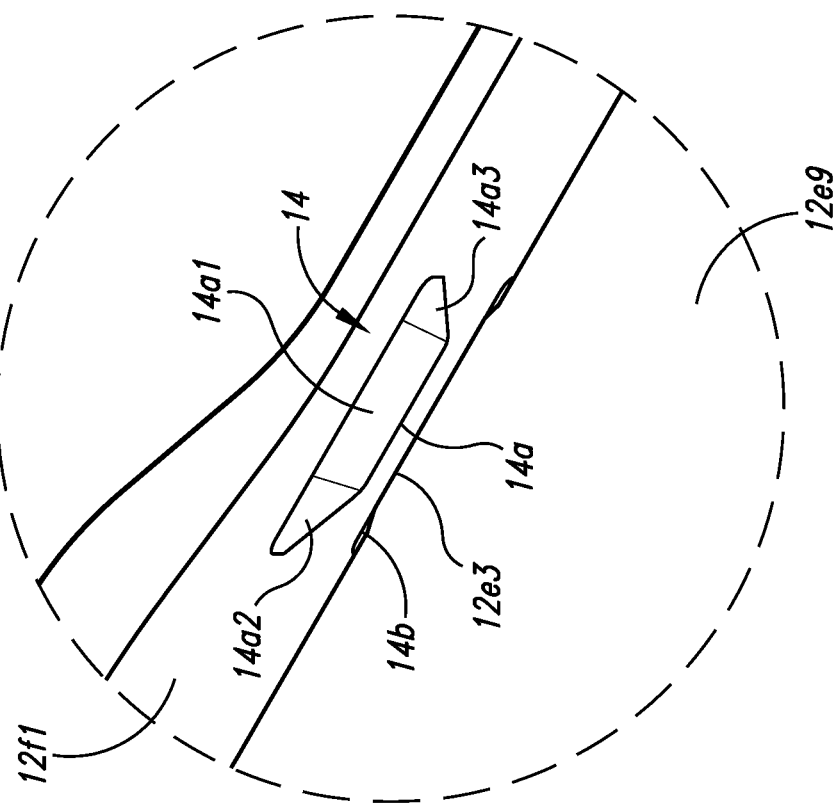
FIG. 6B is an enlarged perspective view of the dashed-circle portion labeled "6B" of the case assembly shown in FIG. 5.
Figure 6A:
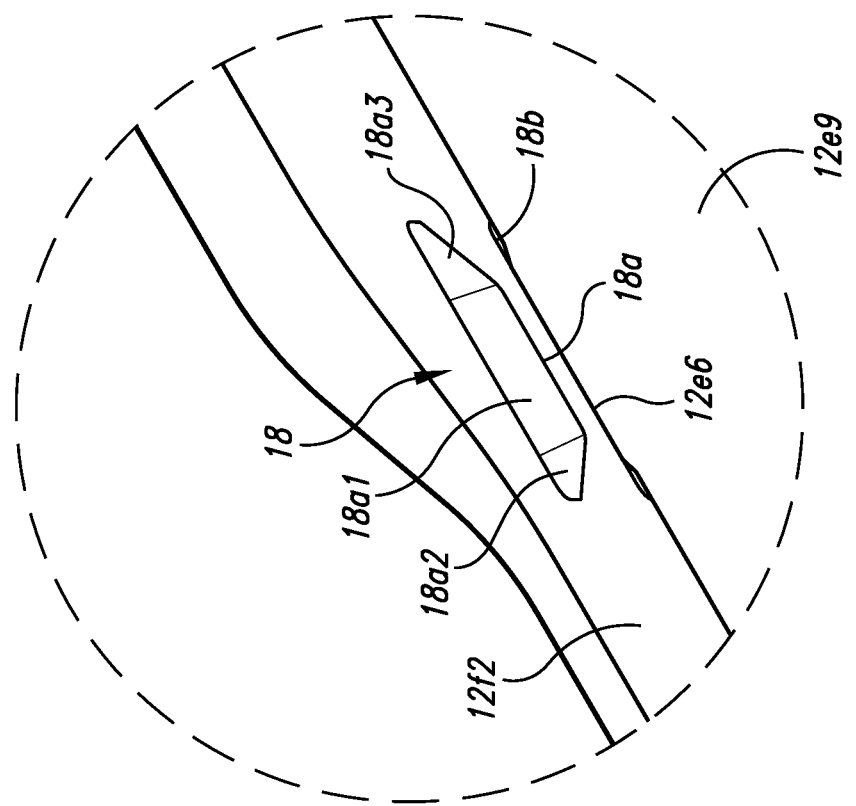
FIG. 6A is an enlarged perspective view of the dashed-circle portion labeled "6A" of the case assembly shown in FIG. 5.

Turning to FIG. 6A, depicted therein is an enlarged perspective view of the dashed-circle portion labeled "6A" of the case assembly 10 shown in FIG. 5. The third notch set 18 is shown include upper notch 18a and lower notch 18b. The upper notch 18a is shown to include center portion 18a1, first lateral portion 18a2, and second lateral portion 18a3. The fourth tab 12e6 is shown engaged with lower notch 18b.

Turning to FIG. 6B, depicted therein is an enlarged perspective view of the dashed-circle portion labeled "6B" of the case assembly 10 shown in FIG. 5. The first tab 12e3 is shown engaged with lower notch 14b.

Figure 6C:
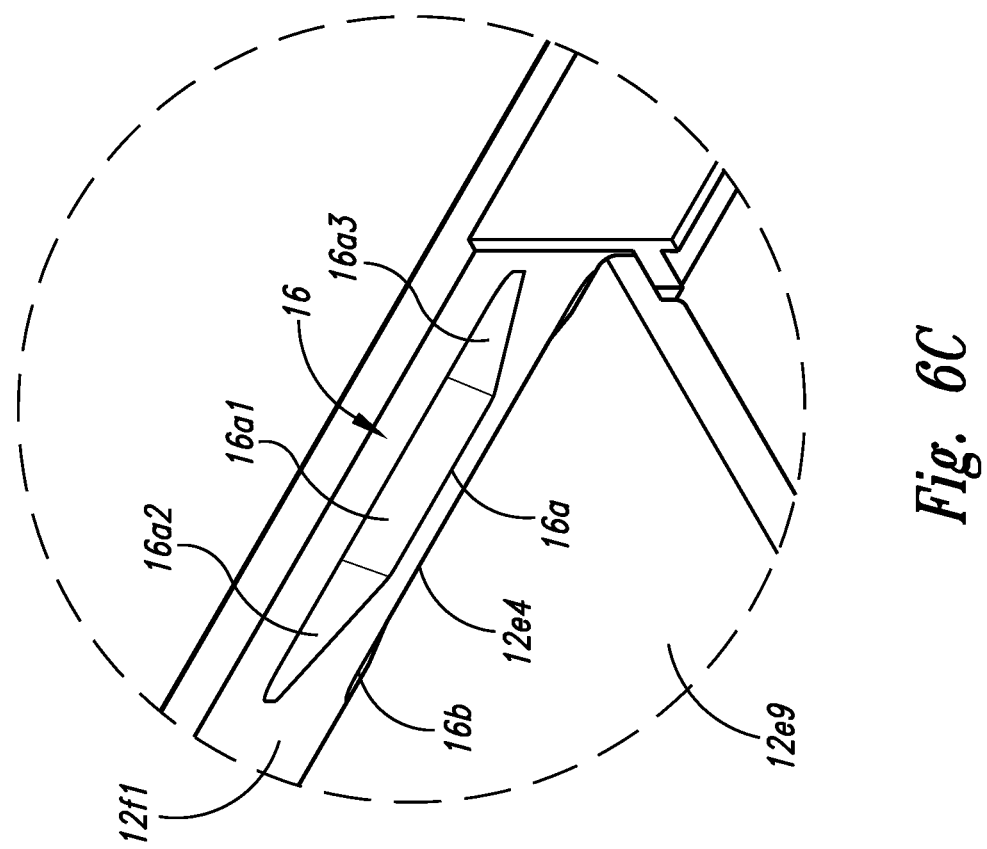
FIG. 6C is an enlarged perspective view of the dashed-circle portion labeled "6C" of the case assembly shown in FIG. 5.

Turning to FIG. 6C, depicted therein is an enlarged perspective view of the dashed-circle portion labeled "6C" of the case assembly 10 shown in FIG. 5. The second tab 12e4 is shown engaged with lower notch 16b.

Figure 7:
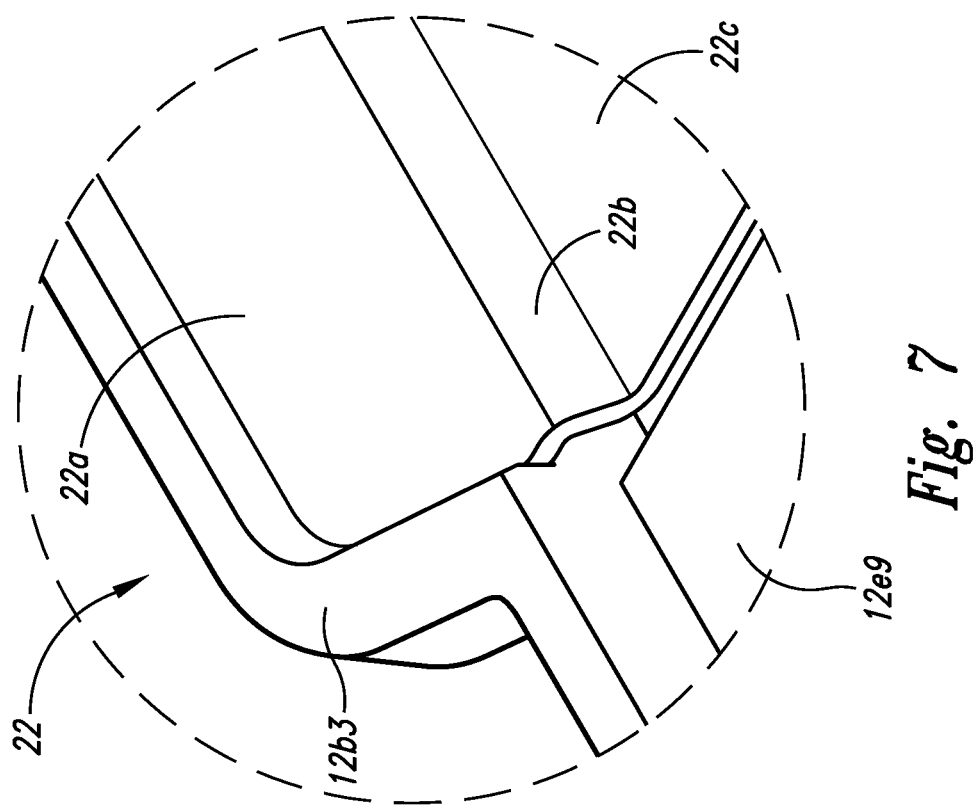
FIG. 7 is an enlarged perspective view of the dashed-circle portion labeled "7" of the case assembly shown in FIG. 5.

Turning to FIG. 7, depicted therein is an enlarged perspective view of the dashed-circle portion labeled "7" of the case assembly 10 shown in FIG. 5. The flexible portion 22b is shown in a flatten configuration to allow for positioning of door panel 12e in a closed position.

Figure 8:
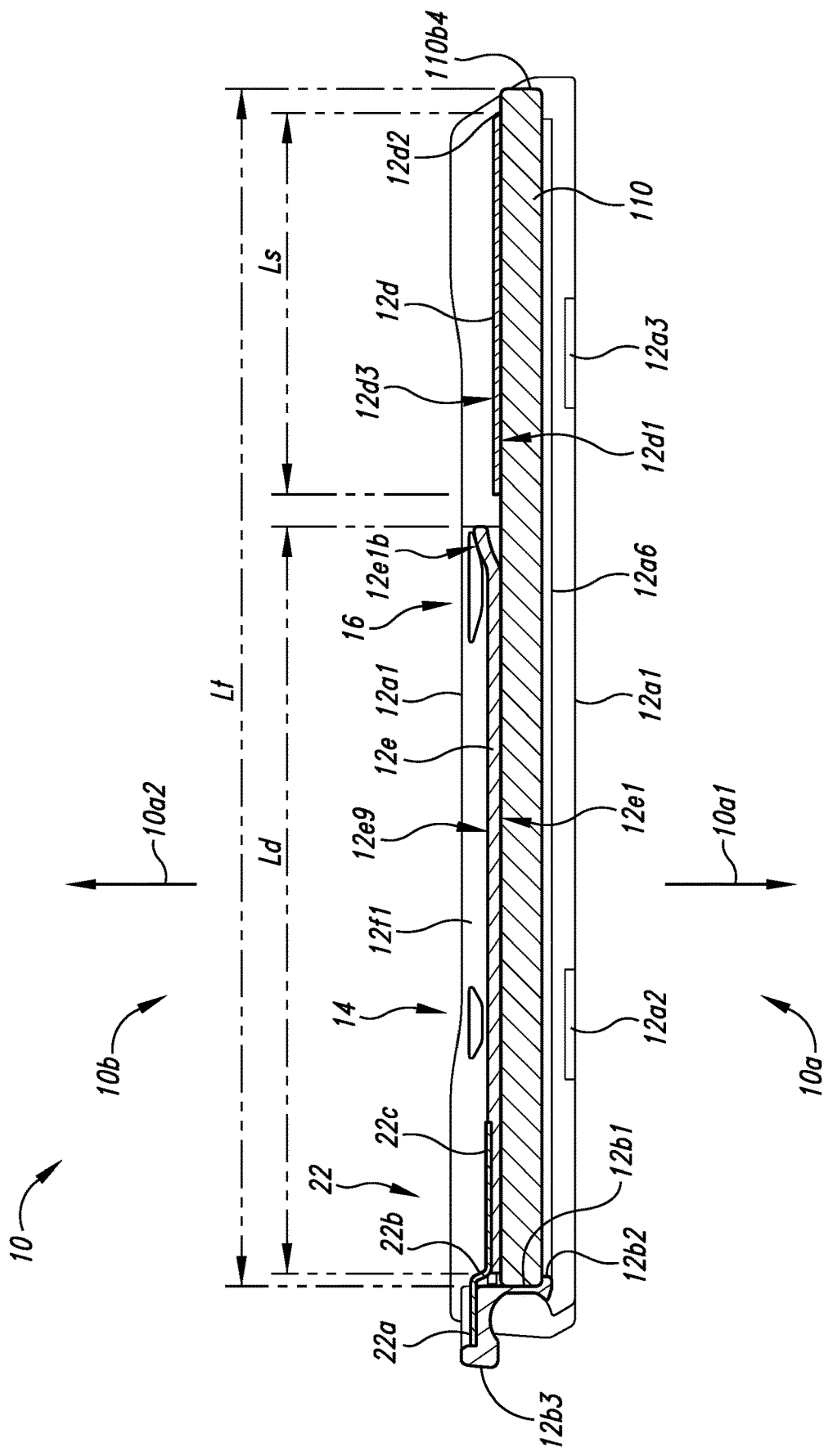
FIG. 8 is a cross-sectional side-elevational view of the laptop case assembly taken along the 8-8 cut line of FIG. 5.

Turning to FIG. 8, depicted therein is a cross-sectional side-elevational view of the laptop case assembly 10 taken along the 8-8 cut line of FIG. 5. The door panel 12e is shown with a door panel length Ld, The shelf panel 12d is shown with a shelf panel length Ls. The tablet computer 110 is shown with a tablet length Lt.

Figure 9:
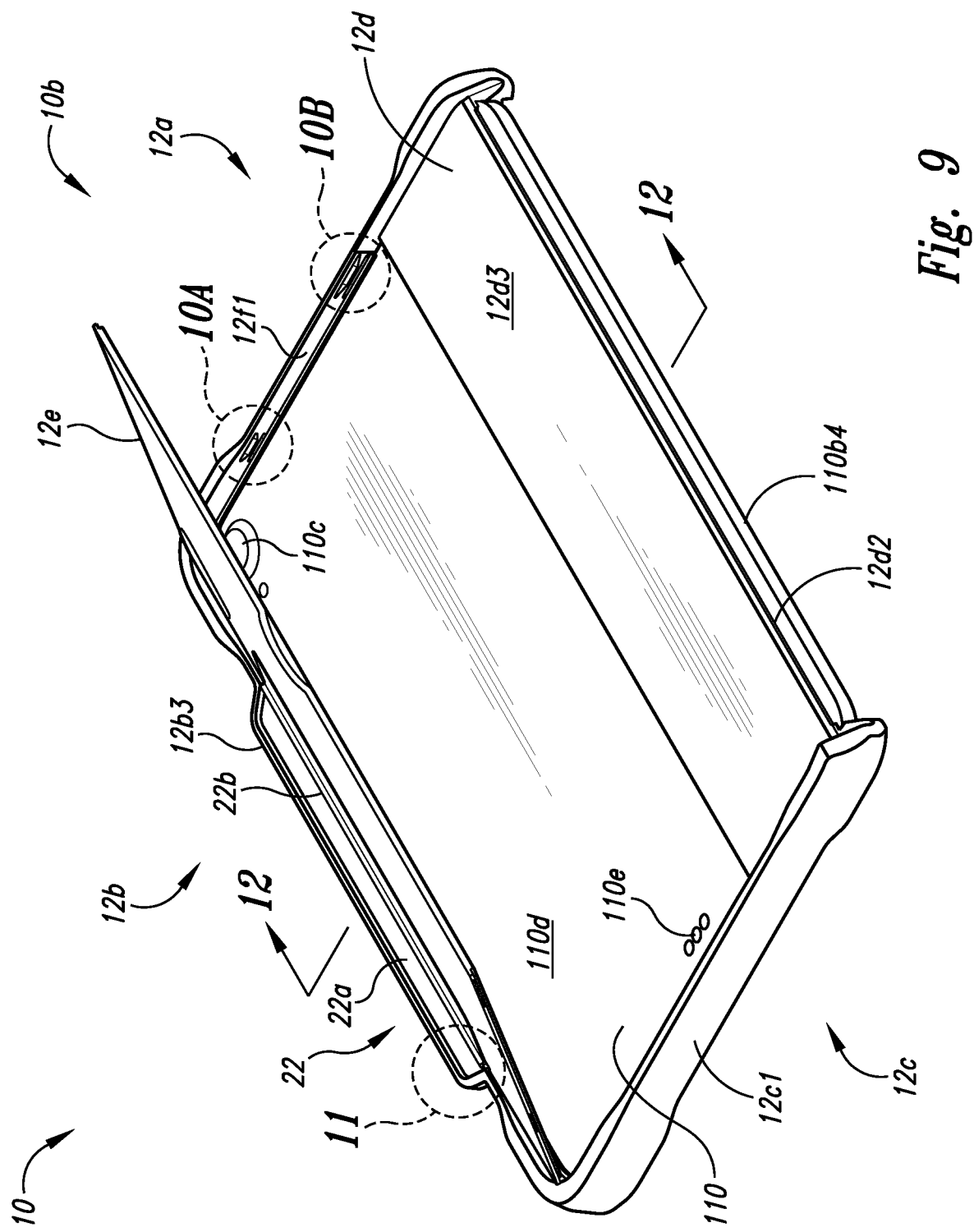
FIG. 9 is a rear perspective view of the case assembly of FIG. 3 with the door panel in a partially open position with a tablet computer being contained by the case assembly.

Turning to FIG. 9, depicted therein is a rear perspective view of the case assembly 10 of FIG. 3 with the door panel 12e in a partially open position with tablet computer 110 being contained by the case assembly 10. The tablet computer 110 is shown with a rear surface 110d, and communication link 110e for communicatively coupled with a keyboard folio (not shown).

Figure 10B:
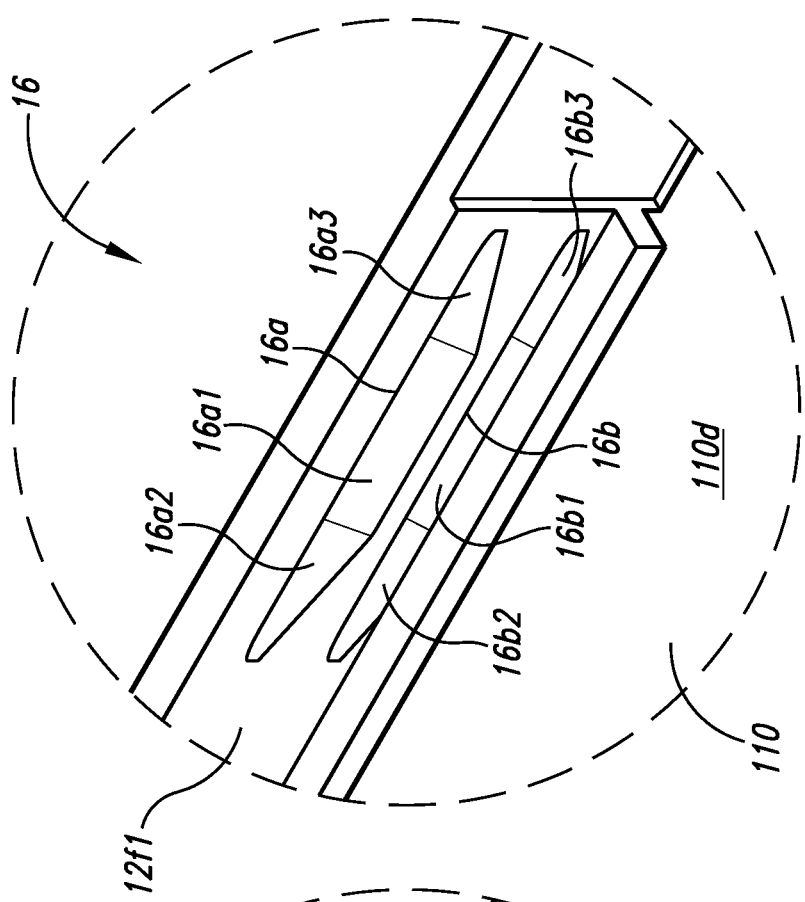
FIG. 10B is an enlarged perspective view of the dashed-circle portion labeled "10B" of the case assembly shown in FIG. 9.
Figure 10A:
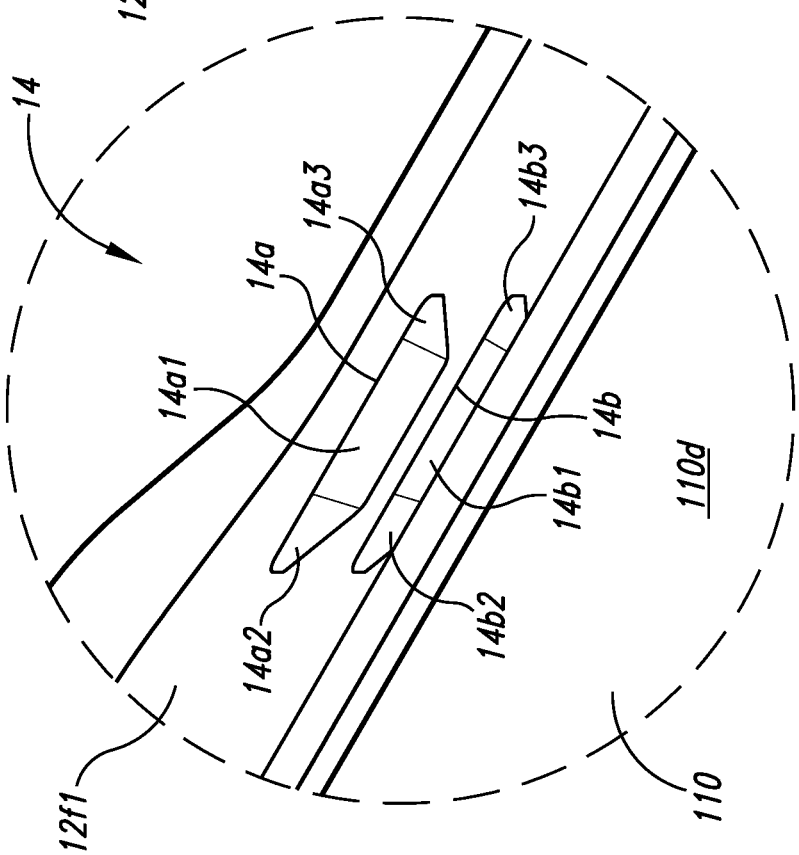
FIG. 10A is an enlarged perspective view of the dashed-circle portion labeled "10A" of the case assembly shown in FIG. 9.

Turning to FIG. 10A, depicted therein is an enlarged perspective view of the dashed-circle portion labeled "10A" of the case assembly 10 shown in FIG. 9.

Turning to FIG. 10B, depicted therein is an enlarged perspective view of the dashed-circle portion labeled "10B" of the case assembly 10 shown in FIG. 9.

Figure 11:
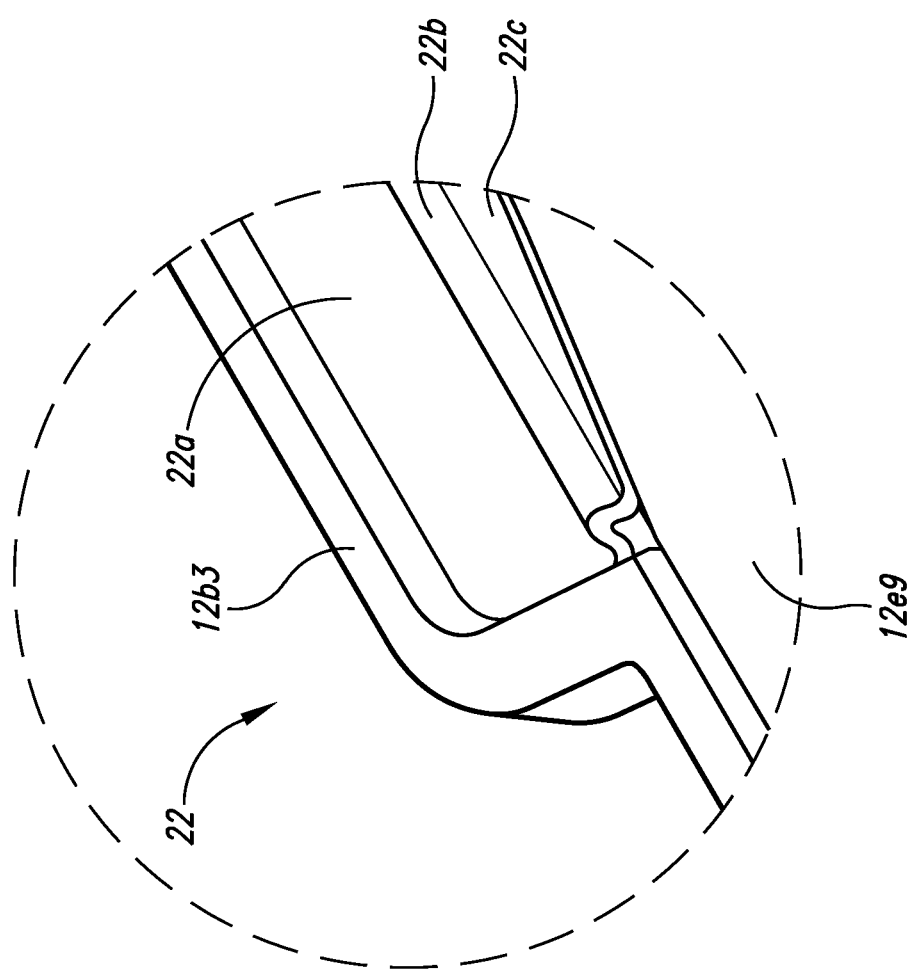
FIG. 11 is an enlarged perspective view of the dashed-circle portion labeled "11" of the case assembly shown in FIG. 9.

Turning to FIG. 11, depicted therein is an enlarged perspective view of the dashed-circle portion labeled "11" of the case assembly 10 shown in FIG. 9. The flexible portion 22b is shown in a folded configuration to allow for positioning of door panel 12e in an open position.

Figure 12:
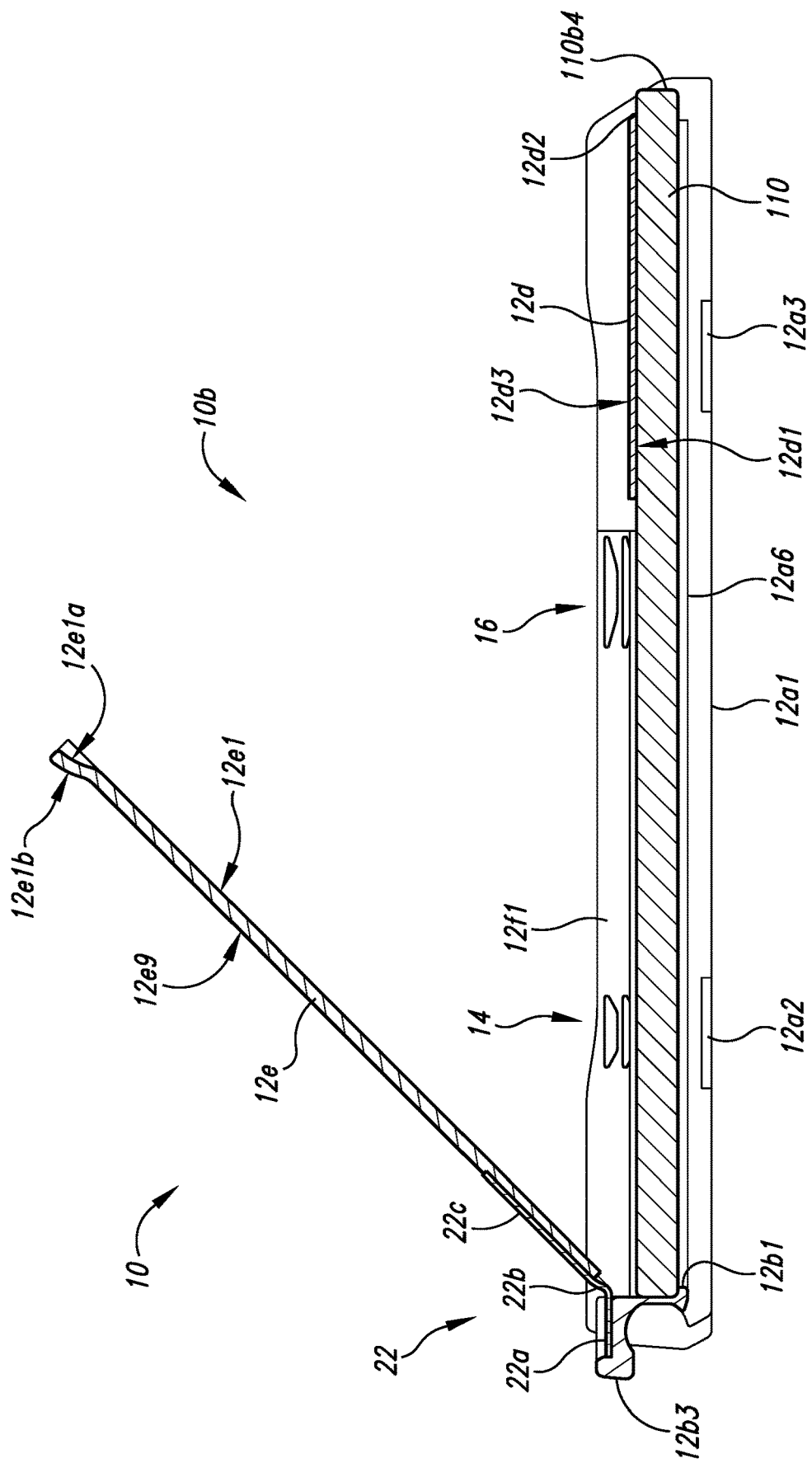
FIG. 12 is a cross-sectional side-elevational view of the case assembly taken along the 12-12 cut line of FIG. 9.

Turning to FIG. 12, depicted therein is a cross-sectional side-elevational view of the case assembly 10 taken along the 12-12 cut line of FIG. 9 shown containing tablet computer 110 with door panel 12e in an open position and with a portion of tablet computer 110 adjacent shelf panel 12d.

Figure 13:
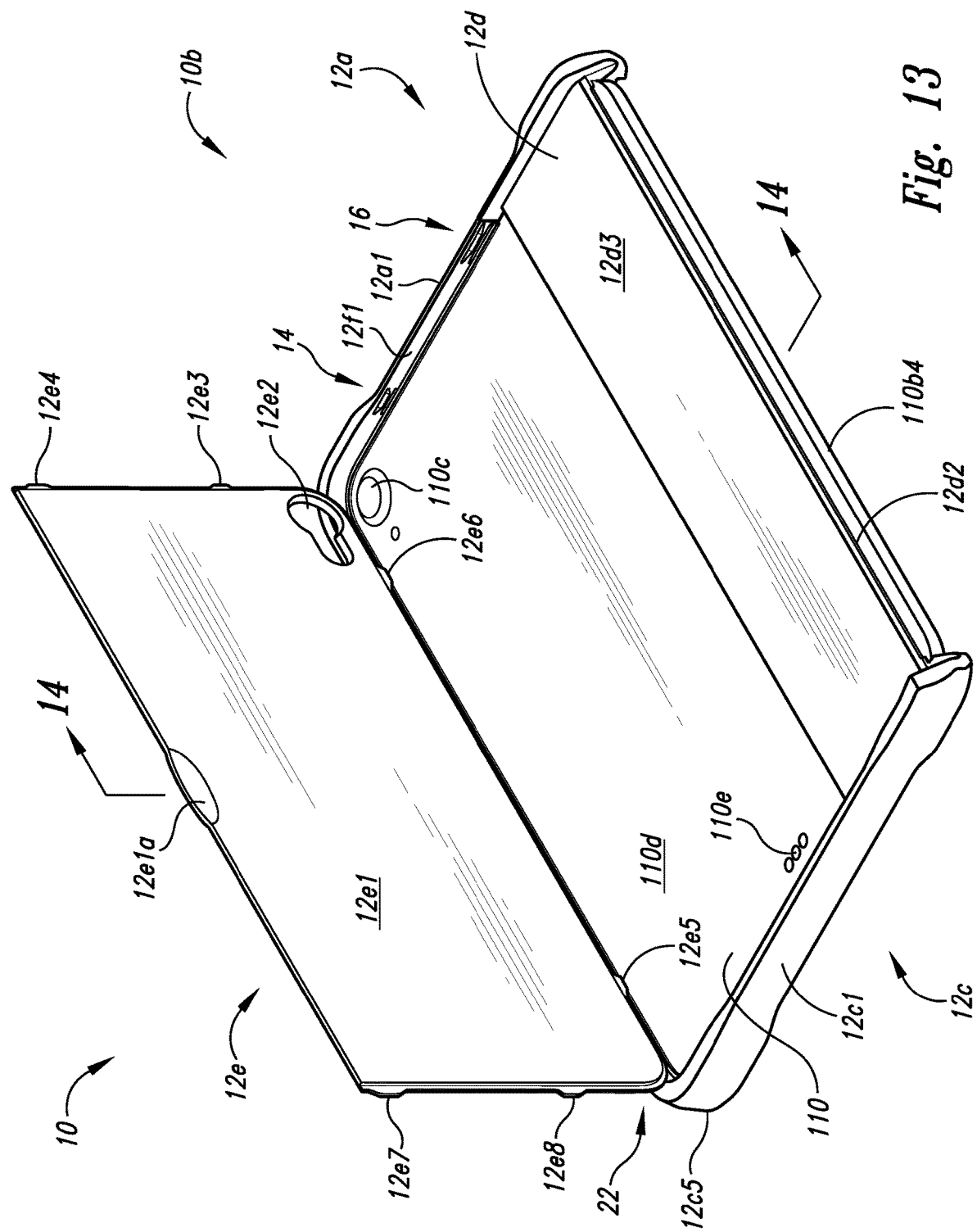
FIG. 13 is a rear perspective view of the case assembly of FIG. 3 with the door panel in a fully open position with a tablet computer being contained by the case assembly.

Turning to FIG. 13, depicted therein is a rear perspective view of the case assembly 10 of FIG. 3 with the door panel 12e in a fully open position with tablet computer 110 being contained by the case assembly 10.

Figure 14:
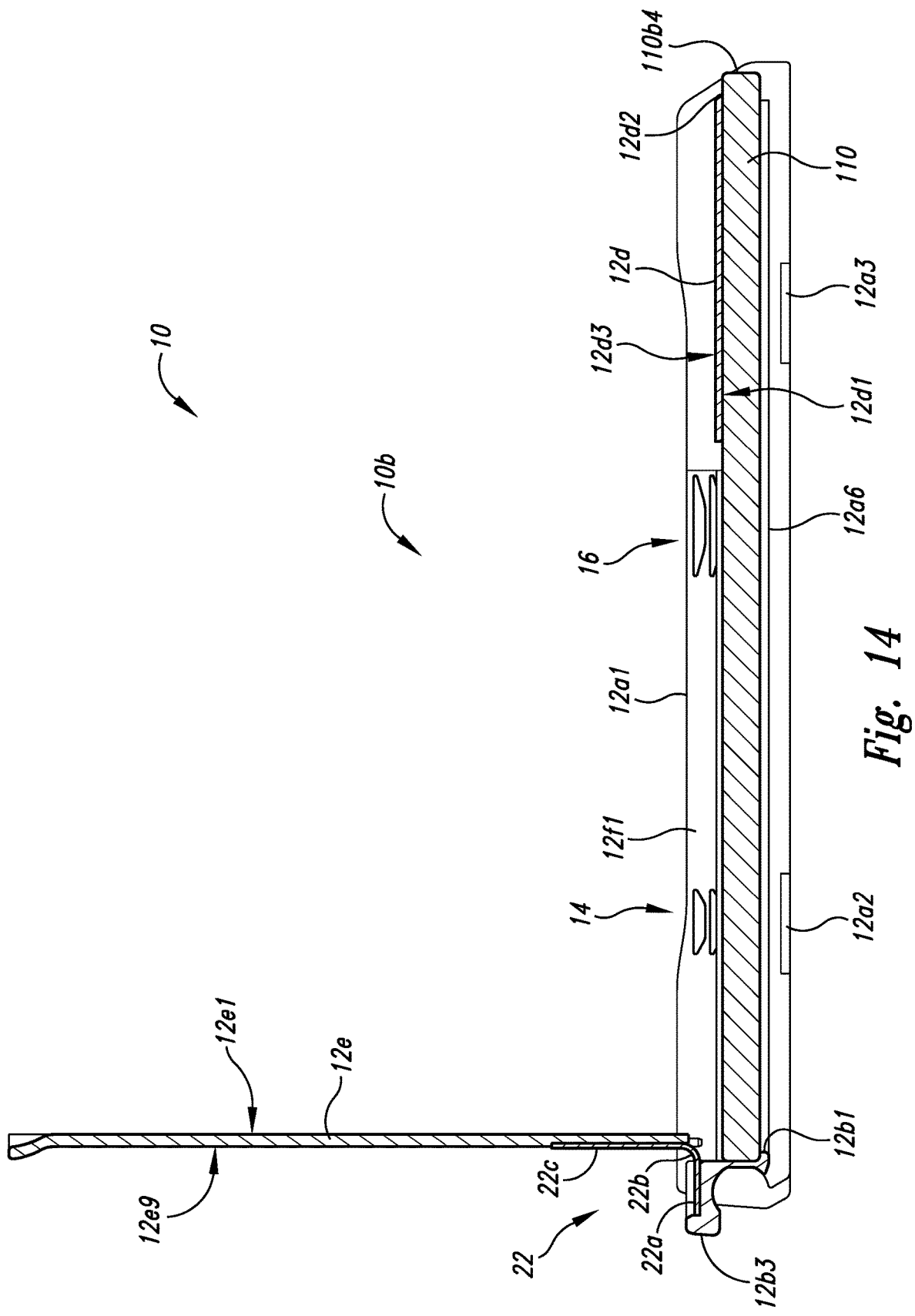
FIG. 14 is a cross-sectional side-elevational view of the case assembly taken along the 14-14 cut line of FIG. 13.

Turning to FIG. 14, depicted therein is a cross-sectional side-elevational view of the case assembly 10 taken along the 14-14 cut line of FIG. 13.

Figure 15:
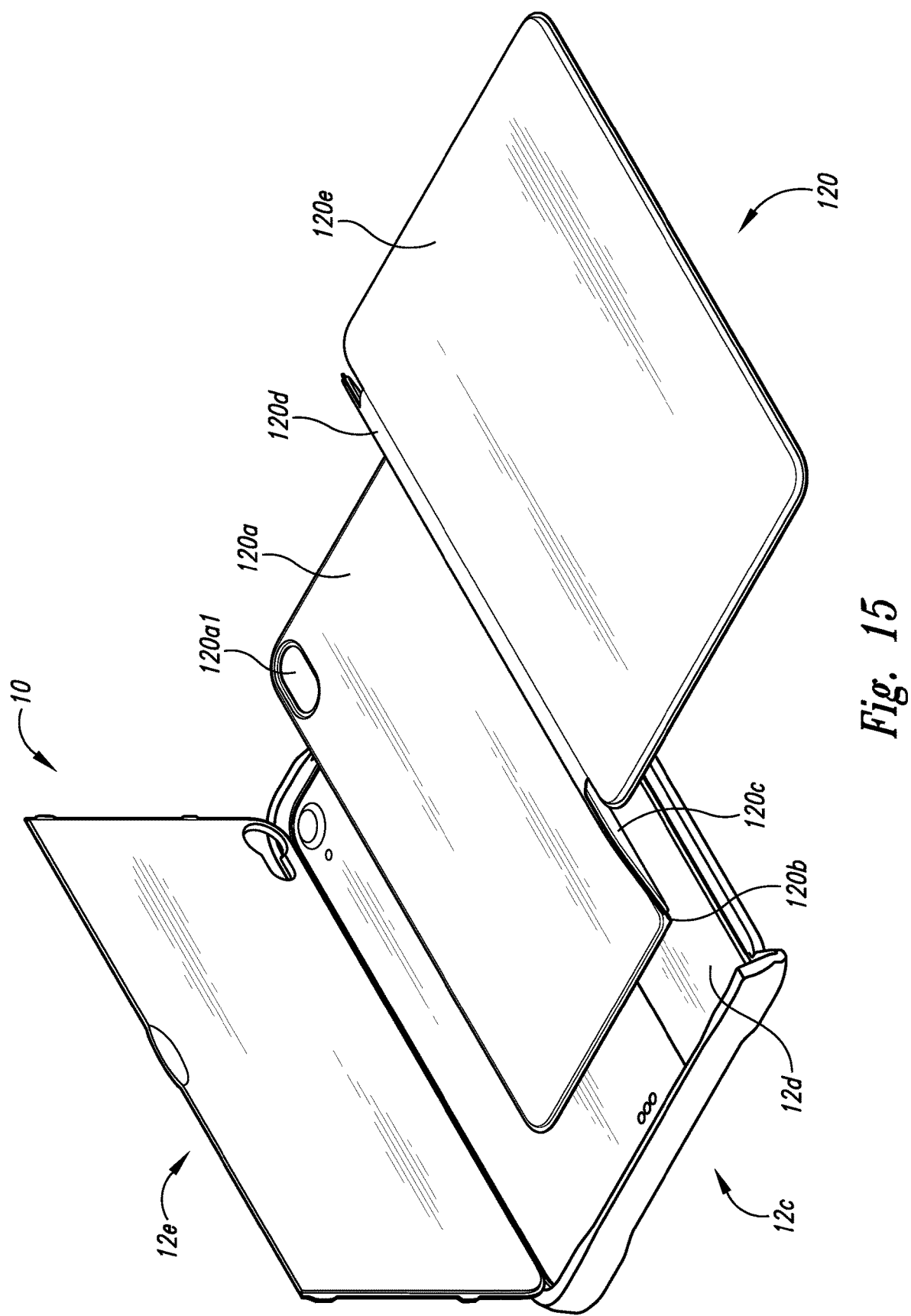
FIG. 15 is a rear perspective view of the case assembly of FIG. 3 with the door panel in a fully open position with a tablet computer being contained by the case assembly and a keyboard folio being positioned to be coupled with the tablet computer.

Turning to FIG. 15, depicted therein is a rear perspective view of the case assembly 10 of FIG. 3 with the door panel 12e in a fully open position with tablet computer 110 being contained by the case assembly 10 and a keyboard folio 120 being positioned to be coupled with tablet computer 110. The keyboard folio 120 is shown to include first segment 120a, second segment 120c, and third segment 120e. The first segment 120a is shown with aperture 120a1. The first segment 120a and second segment 120c are shown hingedly coupled together by first flexible hinge 120b. The second segment 120c and third segment 120e are shown hingedly coupled together by second flexible hinge 120d.

Turning to FIG. 16, depicted therein is a rear perspective view of the case assembly 10 of FIG. 3 with the door panel 12e in a fully open position with tablet computer 110 being contained by the case assembly 10 and keyboard folio 120 coupled with tablet computer 110.

Figure 17B:
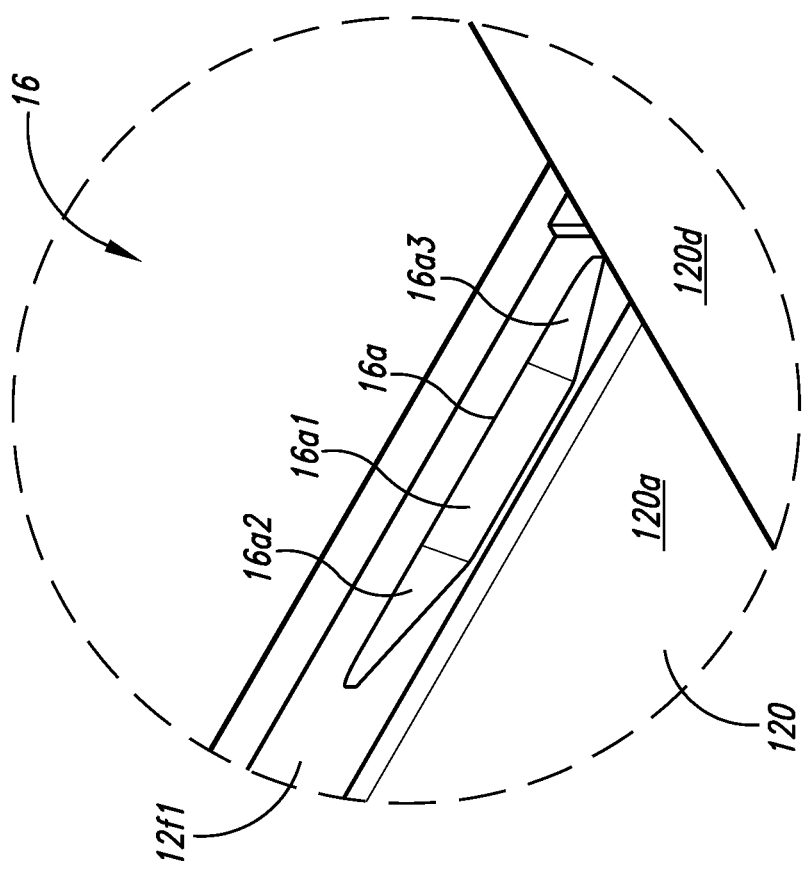
FIG. 17B is an enlarged perspective view of the dashed-circle portion labeled "17B" of the case assembly shown in FIG. 16.
Figure 17A:
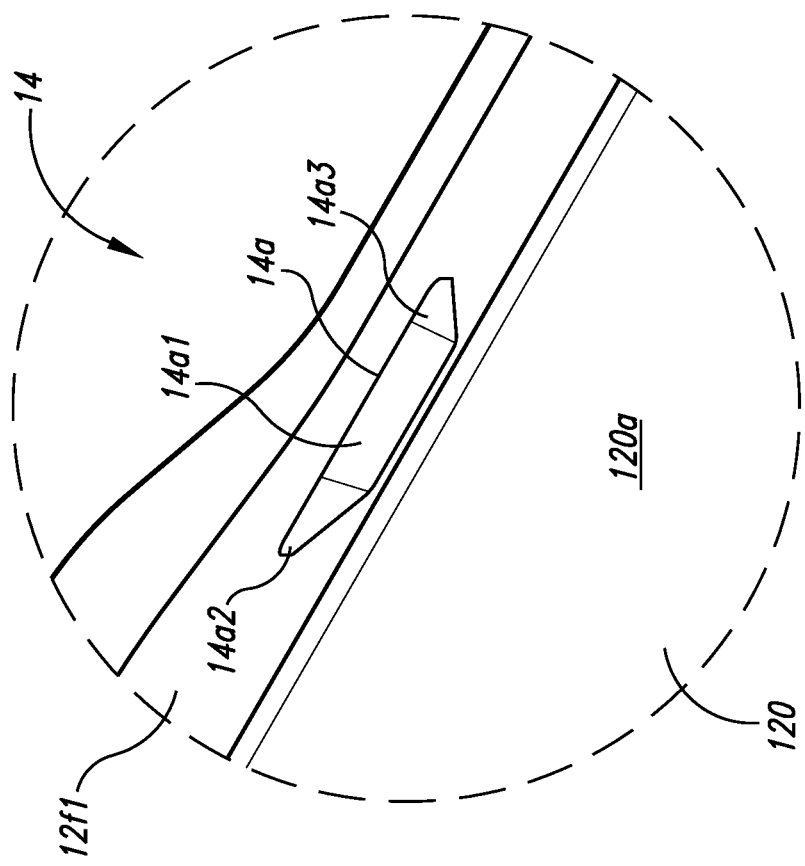
FIG. 17A is an enlarged perspective view of the dashed-circle portion labeled "17A" of the case assembly shown in FIG. 16.

Turning to FIG. 17A, depicted therein is an enlarged perspective view of the dashed-circle portion labeled "17A" of the case assembly 10 shown in FIG. 16. The upper notch 14a is shown to be available for coupling with a tab of door panel 12e.

Turning to FIG. 17B, depicted therein is an enlarged perspective view of the dashed-circle portion labeled "17B" of the case assembly 10 shown in FIG. 16. The upper notch 16a is shown to be available for coupling with a tab of door panel 12e.

Figure 18:
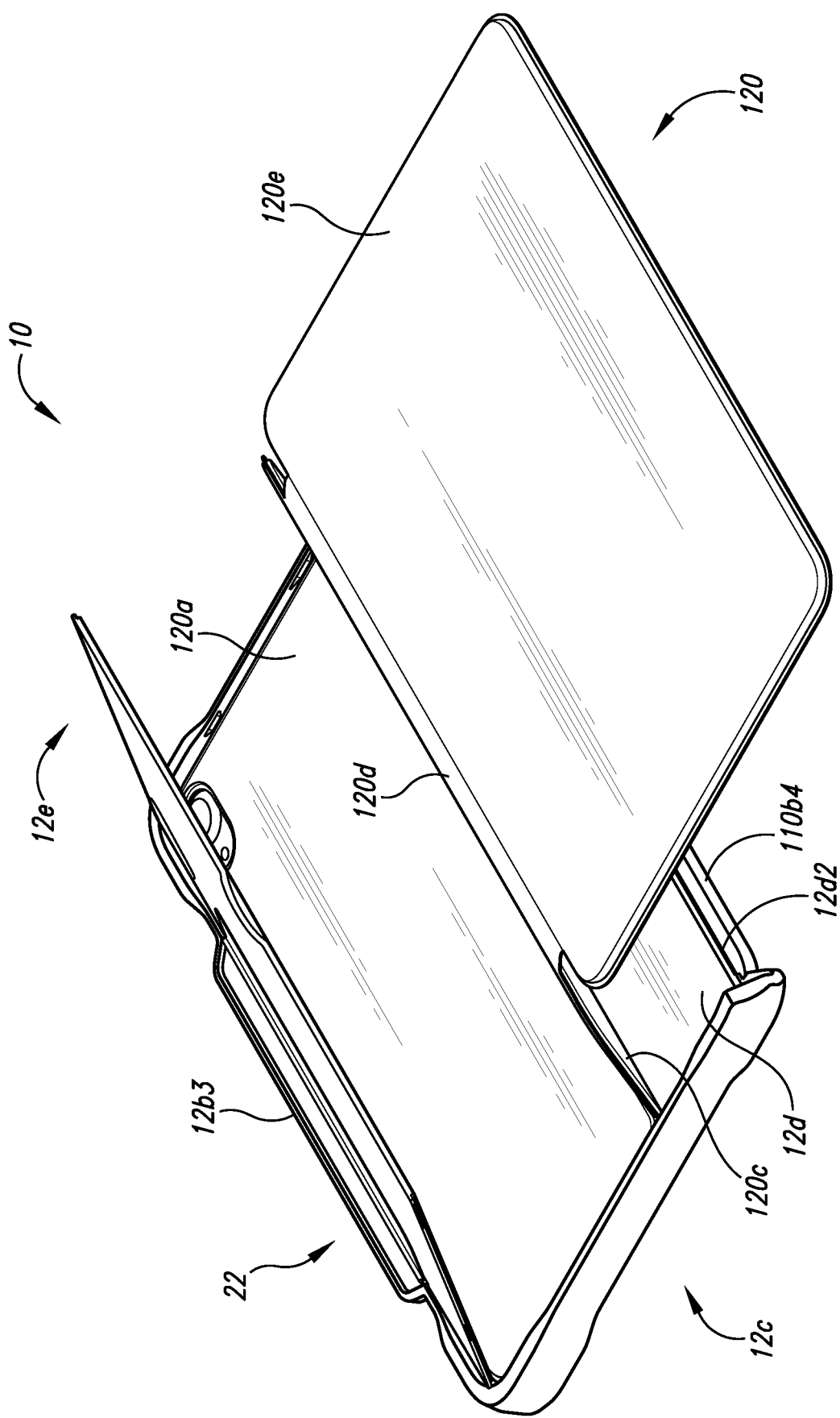
FIG. 18 is a rear perspective view of the case assembly of FIG. 3 with the door panel in a partially open position with a tablet computer being contained by the case assembly and a keyboard folio coupled with the tablet computer.

Turning to FIG. 18, depicted therein is a rear perspective view of the case assembly 10 of FIG. 3 with the door panel 12e in a partially open position with tablet computer 110 being contained by the case assembly 10 and keyboard folio 120 coupled with tablet computer 110.

Figure 19:
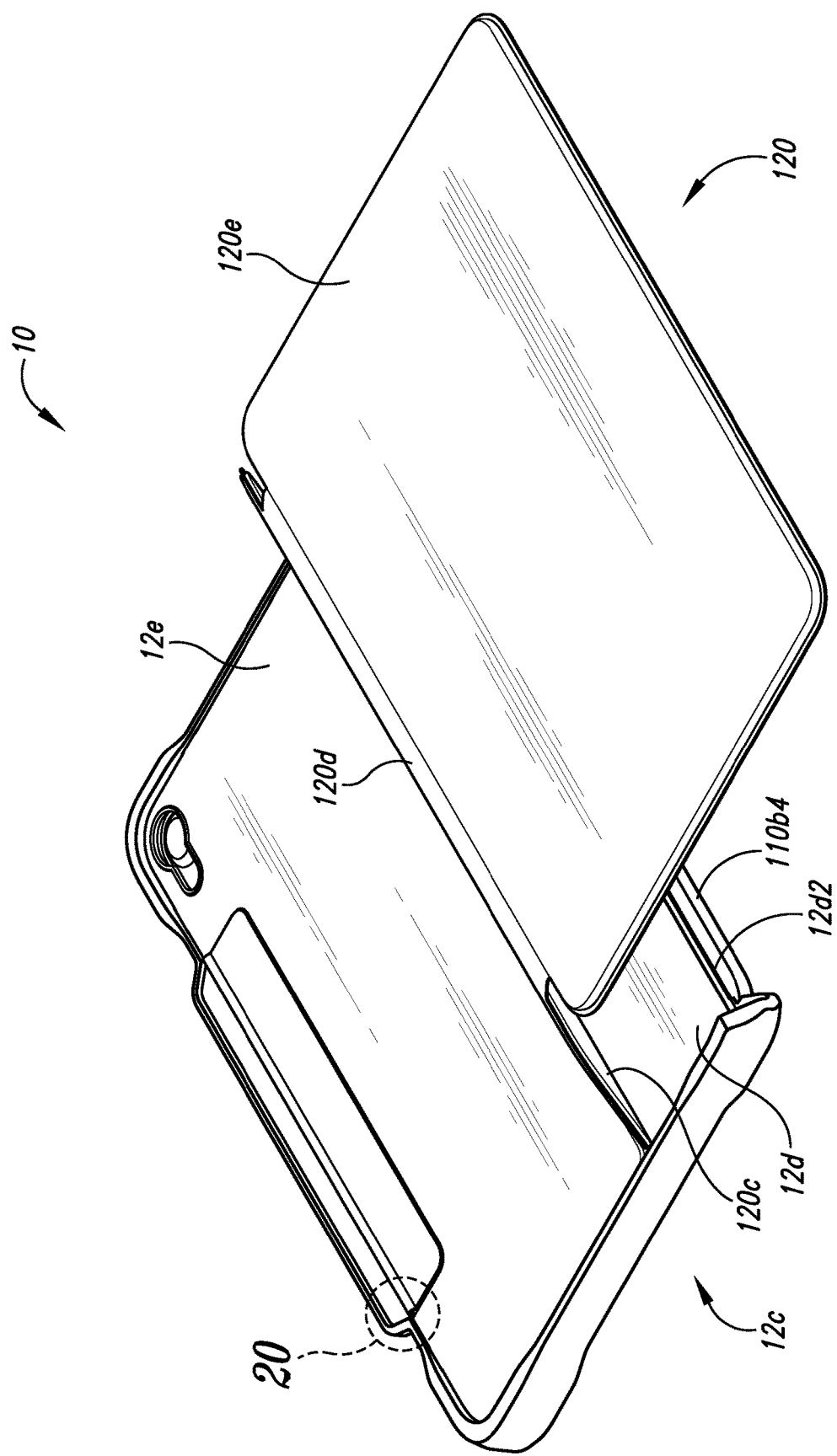
FIG. 19 is a rear perspective view of the case assembly of FIG. 3 with the door panel in a closed position with a tablet computer being contained by the case assembly and a keyboard folio in a first position coupled with the tablet computer.

Turning to FIG. 19, depicted therein is a rear perspective view of the case assembly 10 of FIG. 3 with the door panel 12e in a closed position with tablet computer 110 being contained by the case assembly 10 and keyboard folio 120 in a first position coupled with tablet computer 110.

Figure 20:
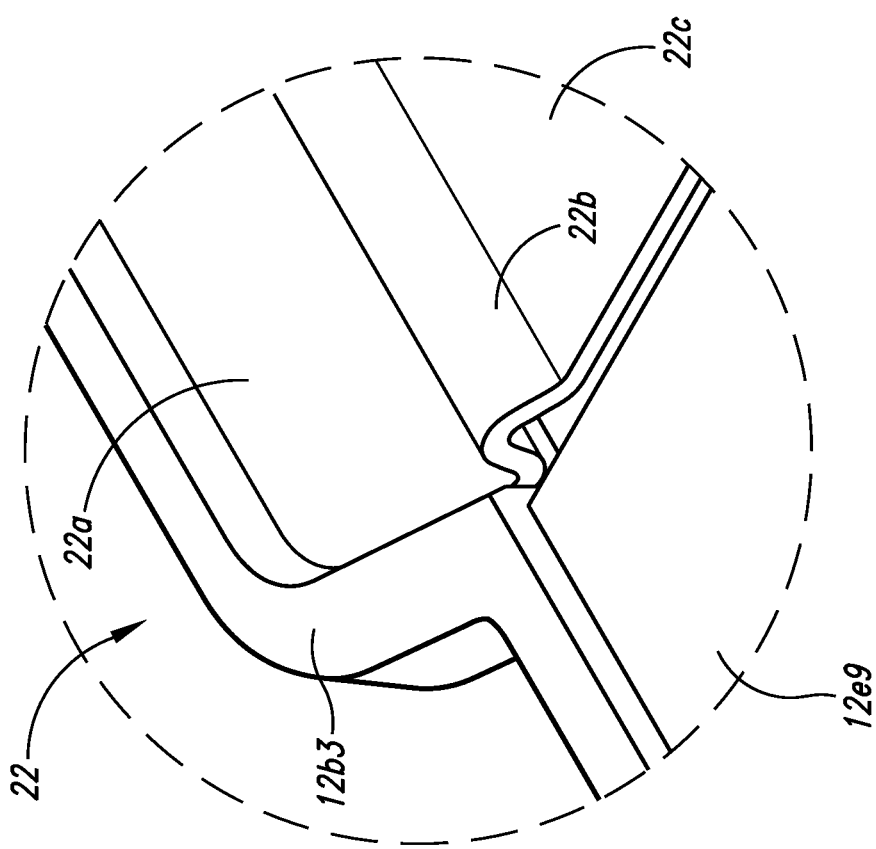
FIG. 20 is an enlarged perspective view of the dashed-circle portion labeled "20" of the case assembly shown in FIG. 19.

Turning to FIG. 20, depicted therein is an enlarged perspective view of the dashed-circle portion labeled "20" of the case assembly 10 shown in FIG. 19. The flexible portion 22b is shown in a folded configuration to allow for positioning of door panel 12e in a closed position being coupled with frame 12.

Figure 21:
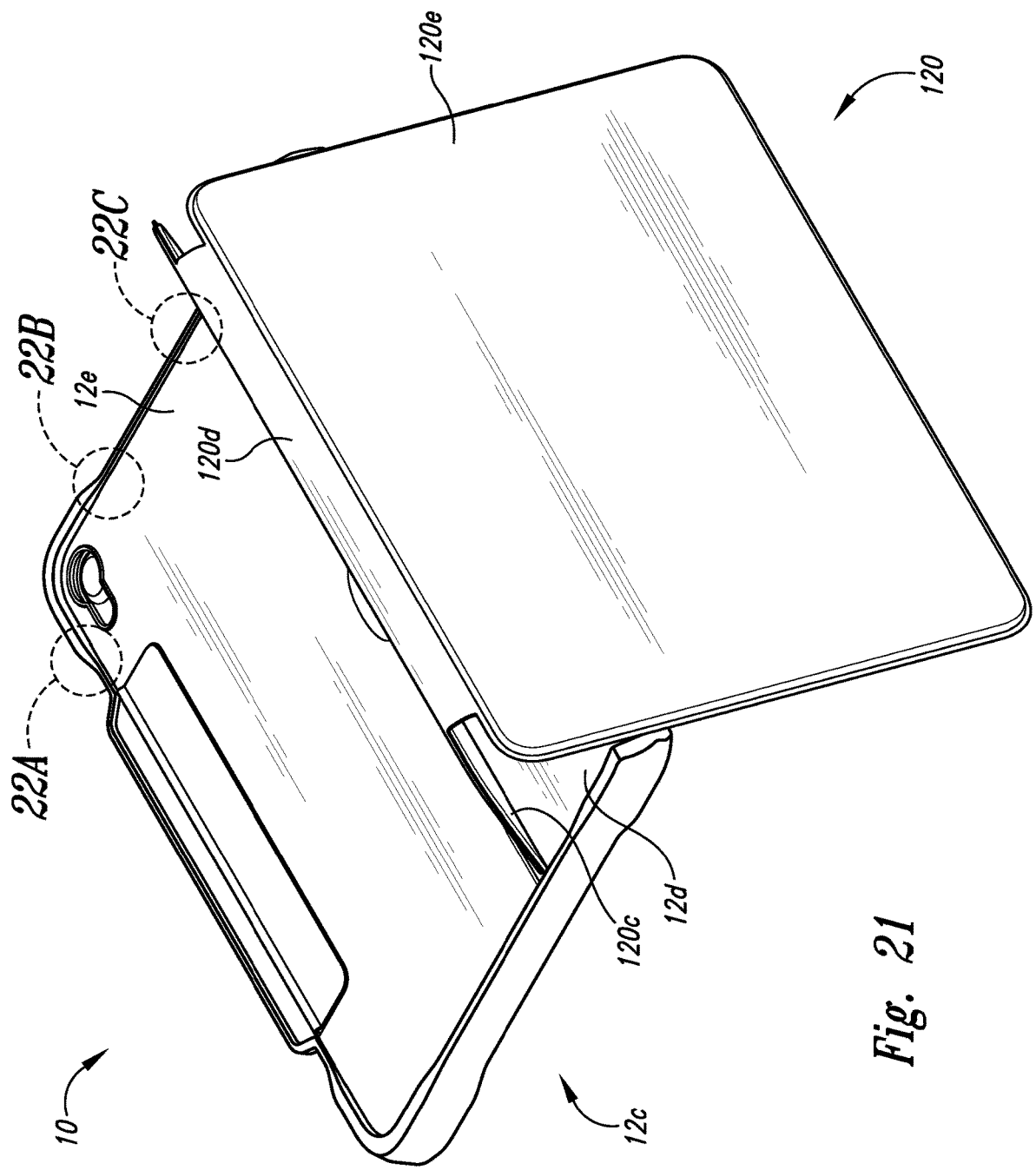
FIG. 21 is a rear perspective view of the case assembly of FIG. 3 with the door panel in a closed position with a tablet computer being contained by the case assembly and a keyboard folio in a second position coupled with the tablet computer.

Turning to FIG. 21, depicted therein is a rear perspective view of the case assembly 10 of FIG. 3 with the door panel 12e in a closed position with tablet computer 110 being contained by the case assembly 10 and keyboard folio 120 in a second position coupled with tablet computer 110.

Figure 22B:
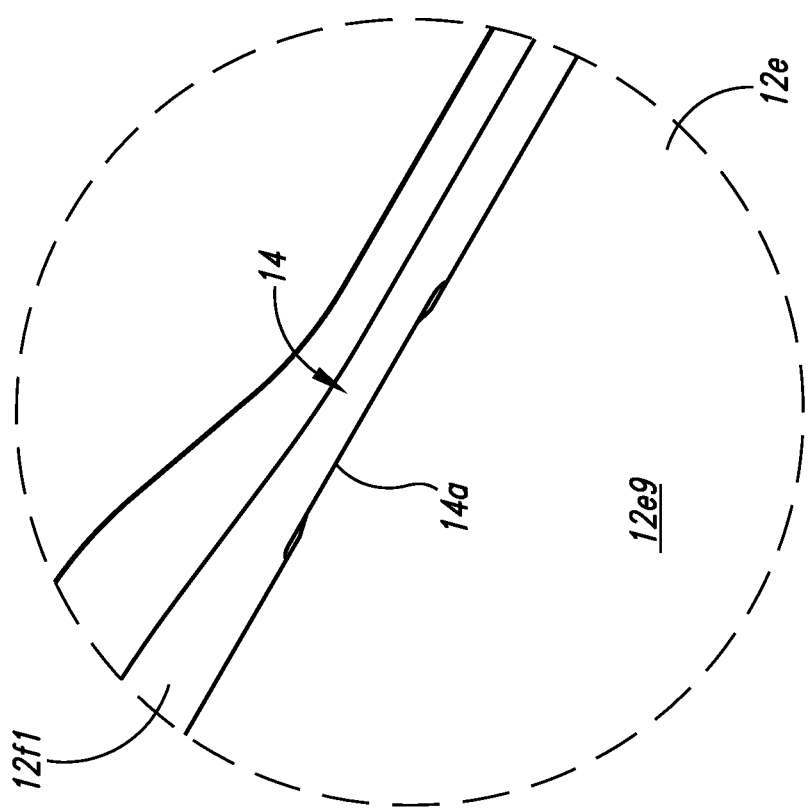
FIG. 22B is an enlarged perspective view of the dashed-circle portion labeled "22B" of the case assembly shown in FIG. 21.
Figure 22A:
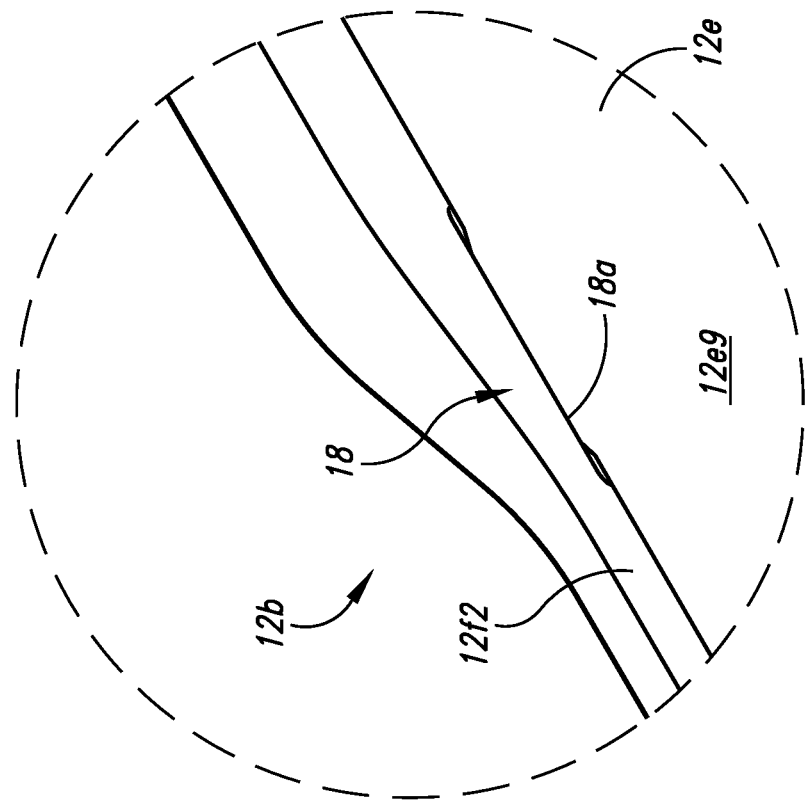
FIG. 22A is an enlarged perspective view of the dashed-circle portion labeled "22A" of the case assembly shown in FIG. 21.

Turning to FIG. 22A, depicted therein is an enlarged perspective view of the dashed-circle portion labeled "22A" of the case assembly 10 shown in FIG. 21. The fourth tab 12e6 is shown engaged with upper notch 18a.

Turning to FIG. 22B, depicted therein is an enlarged perspective view of the dashed-circle portion labeled "22B" of the case assembly 10 shown in FIG. 21. The first tab 12e3 is shown engaged with upper notch 14a.

Figure 22C:
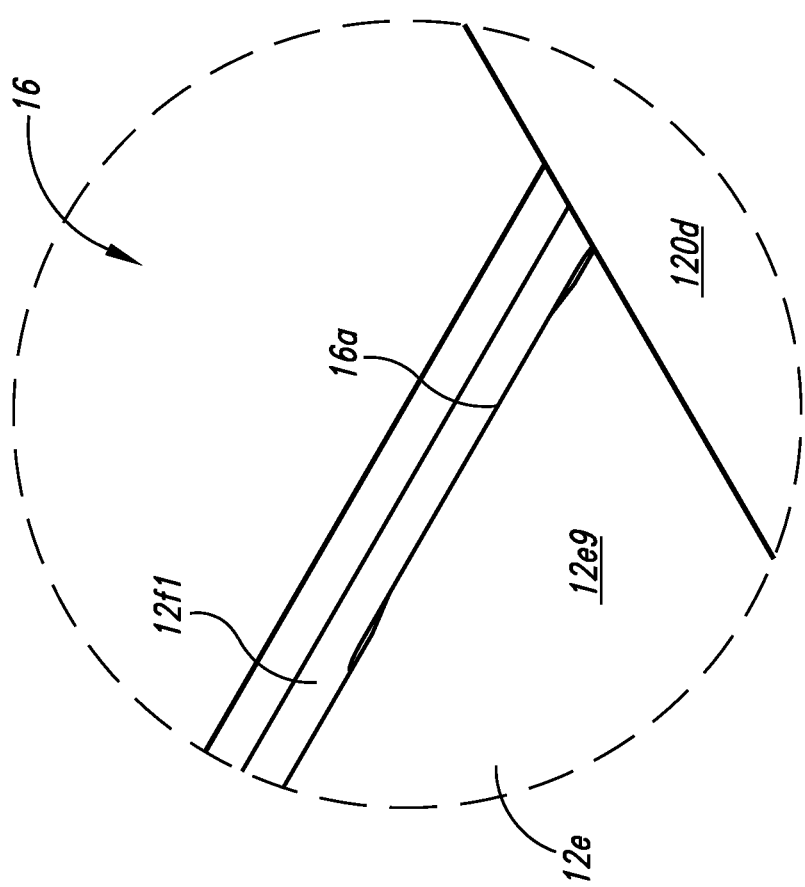
FIG. 22C is an enlarged perspective view of the dashed-circle portion labeled "22C" of the case assembly shown in FIG. 21.

Turning to FIG. 22C, depicted therein is an enlarged perspective view of the dashed-circle portion labeled "22C" of the case assembly 10 shown in FIG. 21. The second tab 12e4 is shown engaged with upper notch 16a.

Turning to FIG. 23, depicted therein is a second rear perspective view of the case assembly 10 of FIG. 3 with the door panel 12e in a closed position with tablet computer 110 being contained by the case assembly 10 and keyboard folio 120 in a second position coupled with tablet computer 110. The third segment 120e is shown to include footing portion 120f and keyboard portion 120g.

Figure 24:
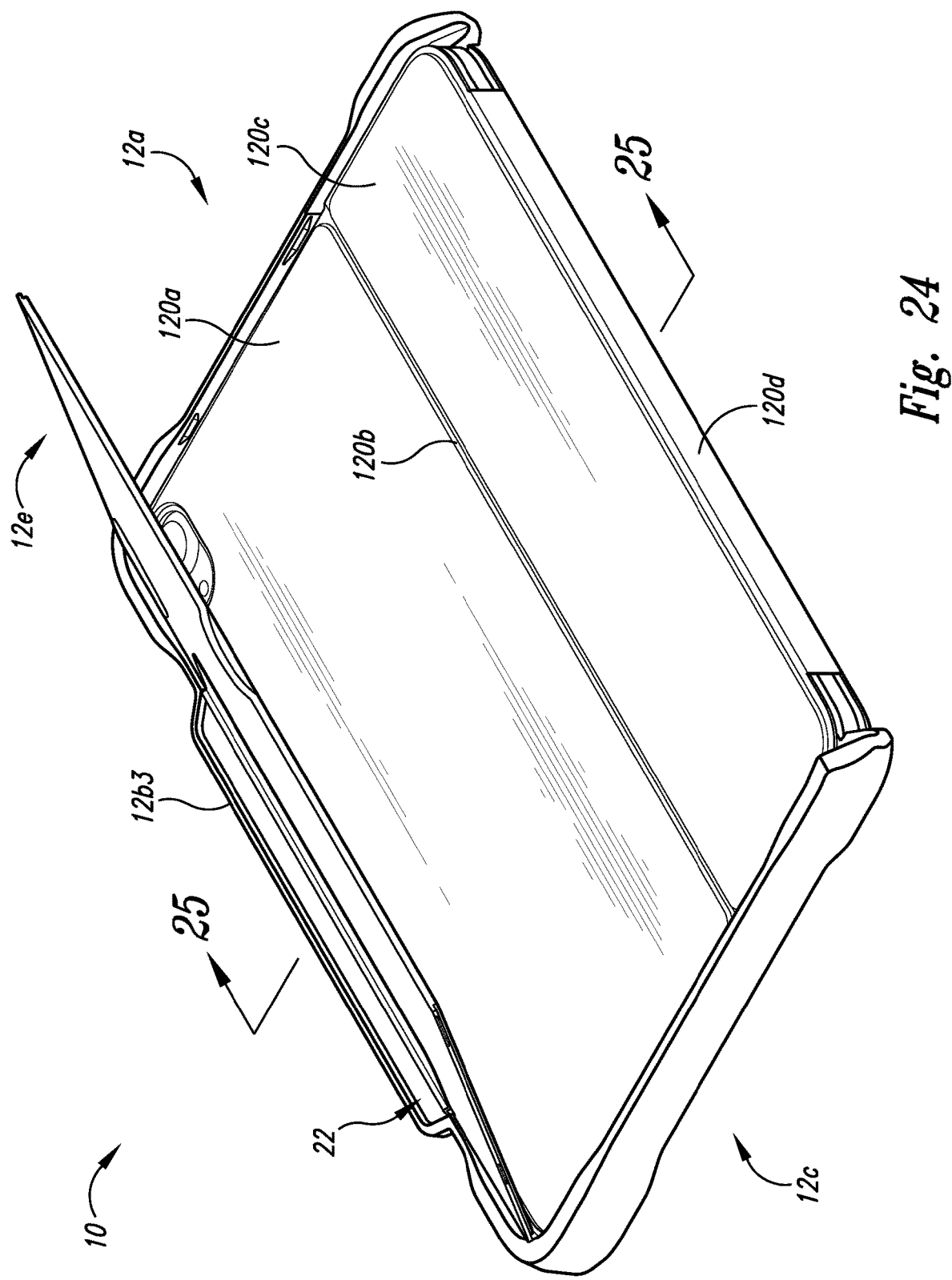
FIG. 24 is a rear perspective view of the case assembly of FIG. 3 with the door panel in a partially open position with a tablet computer being contained by the case assembly and a keyboard folio coupled with the tablet computer.

Turning to FIG. 24, depicted therein is a rear perspective view of the case assembly 10 of FIG. 3 with the door panel 12e in a partially open position with tablet computer 110 being contained by the case assembly 10 and keyboard folio 120 coupled with tablet computer 110.

Figure 25:
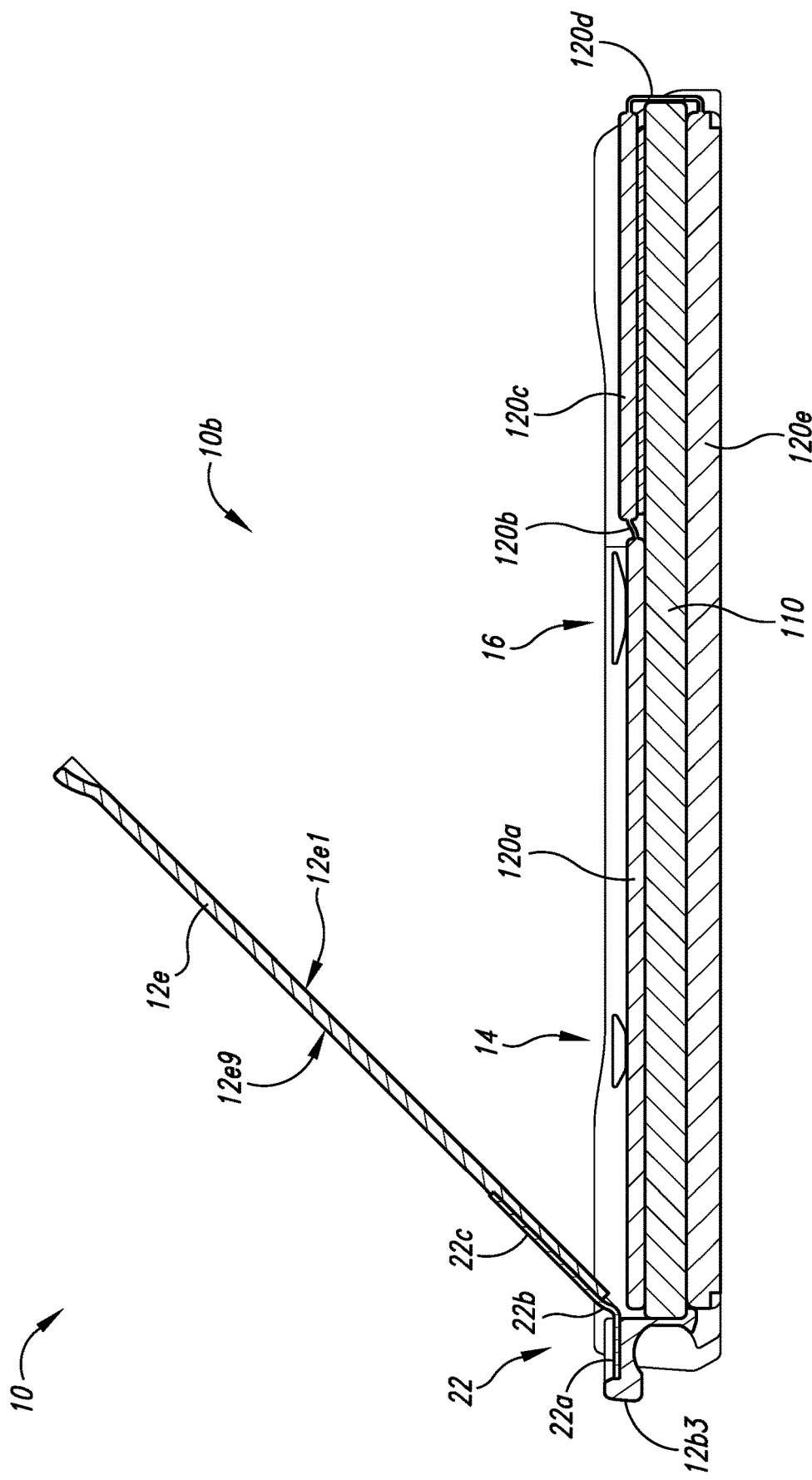
FIG. 25 is a cross-sectional side-elevational view of the case assembly taken along the 25-25 cut line of FIG. 24.

Turning to FIG. 25, depicted therein is a cross-sectional side-elevational view of the case assembly 10 taken along the 25-25 cut line of FIG. 24.

Figure 26:
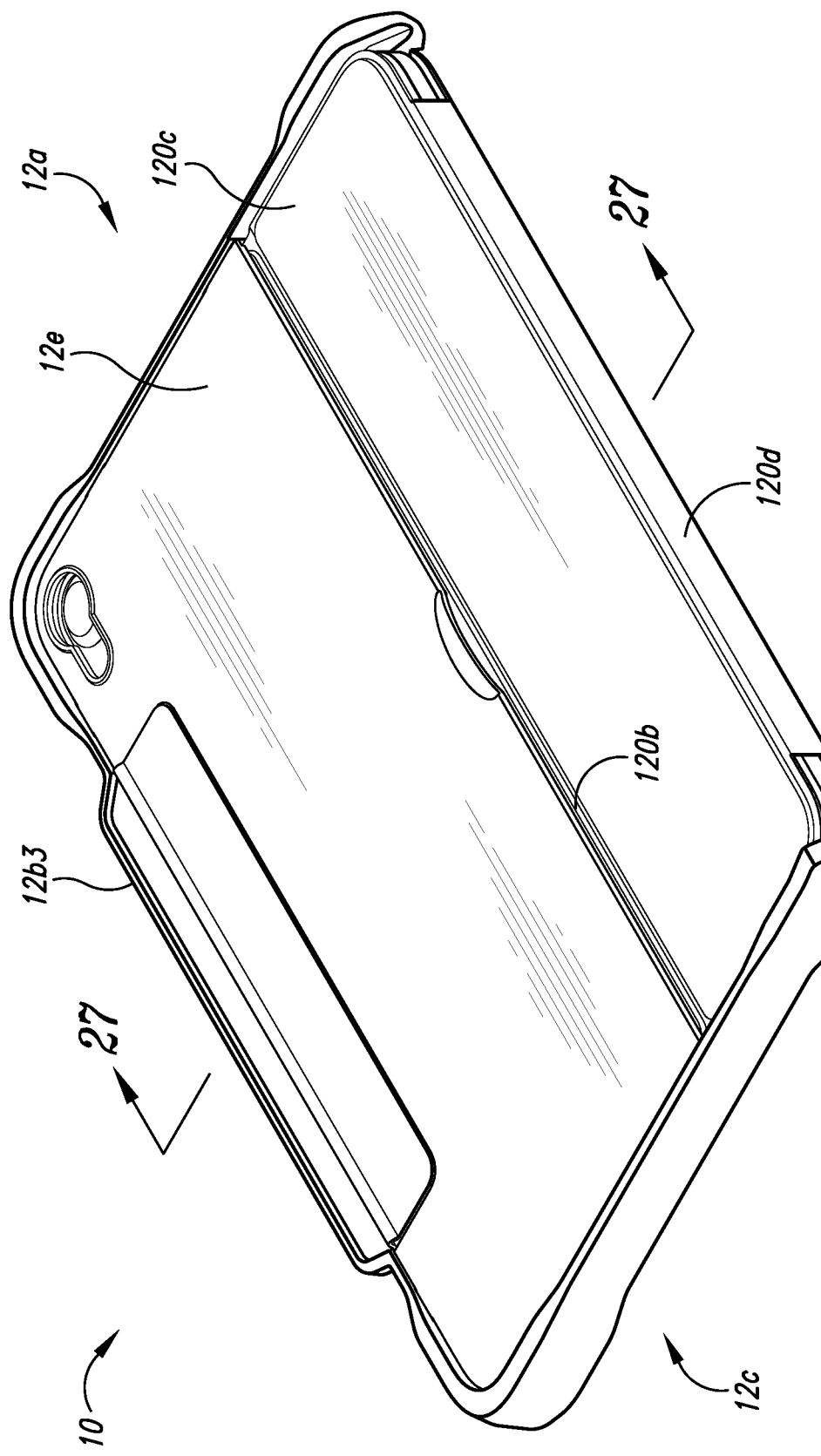
FIG. 26 is a rear perspective view of the case assembly of FIG. 3 with the door panel in a closed position with a tablet computer being contained by the case assembly.

Turning to FIG. 26, depicted therein is a rear perspective view of the case assembly 10 of FIG. 3 with the door panel 12e in a closed position with tablet computer 110 and keyboard folio 120 being contained by case assembly 10.

Figure 27:
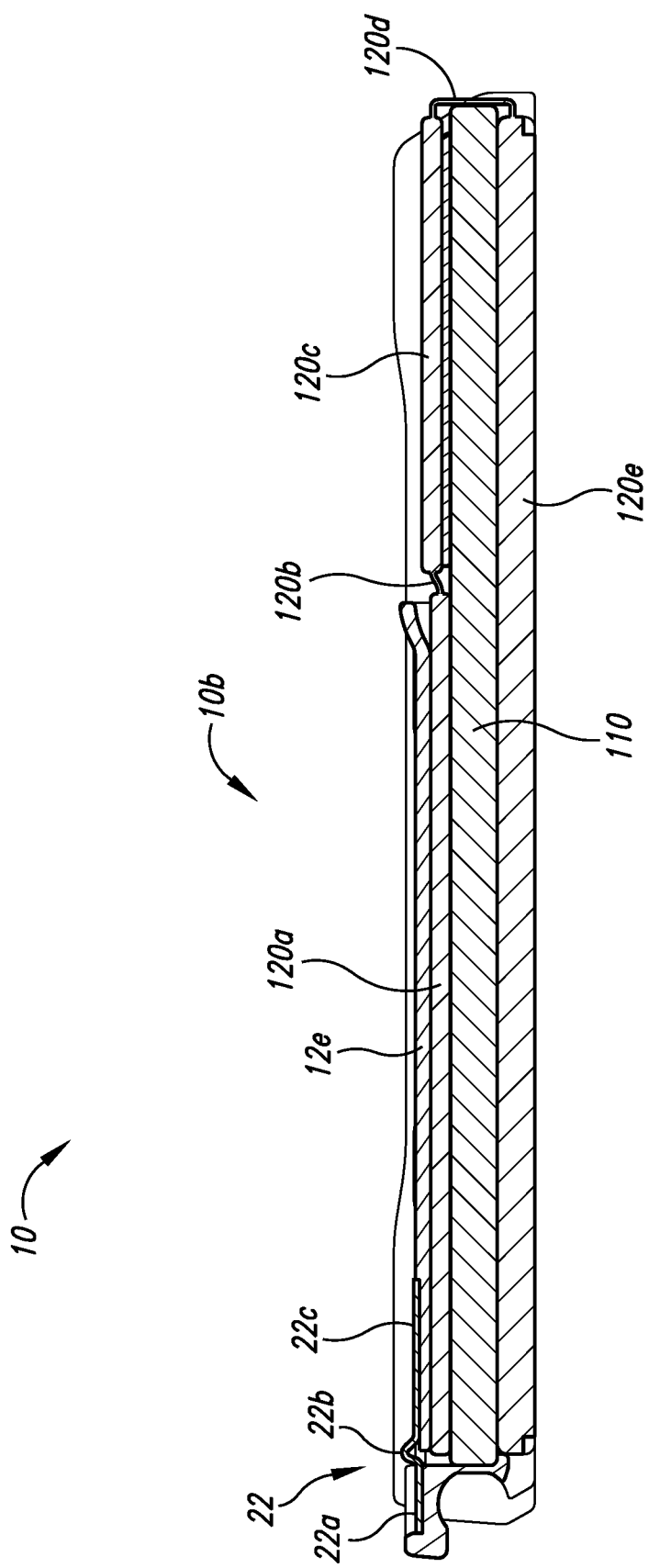
FIG. 27 is a cross-sectional side-elevational view of the case assembly taken along the 26-26 cut line of FIG. 26.

Turning to FIG. 27, depicted therein is a cross-sectional side-elevational view of the case assembly 10, tablet computer 110, and keyboard folio 120 taken along the 26-26 cut line of FIG. 26.

As shown by one or more of FIGS. 1-27, implementations of a case assembly 10 for a tablet computer 110 and for a keyboard folio 120, the case assembly 10 can include a frame 12 including a first wall 12a1 including a first length L1, a second wall 12b1 including a second length L2, and a third wall 12c1 including a third length L3, the first wall 12a1 extending along the first length L1 of the first wall 12a1 parallel to the third length L3 of the third wall 12c1, the first wall 12a1 extending along the first length L1 of the first wall 12a1 perpendicularly to the second length L2 of the second wall 12b1, the first wall 12a1 including at least one coupling area (e.g., though not shown, similar to first notch set 14 or second notch set 16), a door panel portion with a door panel length (e.g., though not shown, similar to door panel length Ld), and a shelf panel portion with a shelf panel length Ls, the third wall 12c1 including at least one coupling area (e.g., first notch set 14 or second notch set 16), a door panel portion with a door panel length Ld and a shelf panel portion with a shelf panel length Ls; a door panel 12e including an interior surface 12e1 and an exterior surface 12e9, the door panel 12e positionable to be removably couplable to the at least one coupling area (e.g., though not shown, similar to first notch set 14 or second notch set 16) of the first wall 12a1 of the frame 12 and positionable to be removably couplable to the at least one coupling area (e.g., first notch set 14 or second notch set 16) of the third wall 12c1 of the frame 12 wherein the door panel 12e in at least one coupled position being coupled to the at least one coupling area (e.g., though not shown, similar to first notch set 14 or second notch set 16) of the first wall 12a1 of the frame 12 and being coupled to the at least one coupling area of the third wall 12c1 of the frame 12, and the door panel 12e in an uncoupled position being uncoupled from the at least one coupling area (e.g., though not shown, similar to first notch set 14 or second notch set 16) of the first wall 12a1 of the frame 12 and being uncoupled from the at least one coupling area (e.g., first notch set 14 or second notch set 16) of the third wall 12c1 of the frame 12, as the door panel 12e being in the at least one coupled position, the door panel 12e positioned to extend alongside of the door panel length (e.g., though not shown, similar to door panel length Ld) of the door panel portion of the first wall 12a1 and to extend alongside of the door panel length Ld of the door panel portion of the third wall 12c1, as the door panel 12e being in the at least one coupled position, the door panel portion of the first wall 12a1 and the door panel portion of the third wall 12c1 extending perpendicularly to the interior surface 12e1 of the door panel 12e in a first direction 10a1, as the door panel 12e being in the at least one coupled position, the door panel portion of the first wall 12a1 and the door panel portion of the third wall 12c1 extending perpendicularly to the exterior surface 12e9 of the door panel 12e in a second direction 10a2, the first direction 10a1 being opposite of the second direction 10a2; and a shelf panel 12d including an interior surface 12d1 and an exterior surface 12d3, the shelf panel 12d coupled to the shelf panel portion of the first wall 12a1 of the frame 12, the shelf panel 12d coupled to the shelf panel portion of the third wall 12c1 of the frame 12, the shelf panel portion of the first wall 12a1 and the shelf panel portion of the third wall 12c1 extending perpendicularly to the interior surface 12d1 of the shelf panel 12d in the first direction 10a1, and the shelf panel portion of the first wall 12a1 and the shelf panel portion of the third wall 12c1 extending perpendicularly to the exterior surface 12d3 of the shelf panel 12d in the second direction 10a2.

Implementations can include as the door panel 12e being in the at least one coupled position, the second wall 12b1 extending perpendicularly to the interior surface 12e1 of the door panel 12e in the first direction 10a1 and the second wall 12b1 extending perpendicularly to the exterior surface 12e9 of the door panel 12e in the second direction 10a2.

Implementations can further include a hinge assembly 22, the hinge assembly 22 including a frame attachment 22a, a door panel attachment 22c, and a flexible portion 22b, the frame attachment 22a coupled to the second wall 12b1 of the frame 12, the door panel attachment 22c coupled to the exterior surface 12e9 of the door panel 12e, and the flexible portion 22b extending between the frame attachment 22a and the door panel attachment 22c.

Implementations can include the hinge assembly 22 including a hinge length Lh and the hinge length Lh of the hinge assembly 22 being at least one-half the second length L2 of the second wall 12b1.

Implementations can include the flexible portion 22b of the hinge assembly 22 being foldable and flattenable to allow for desired positioning of the door panel 12e.

Implementations can further include at least one first rib 12a6 extending along the first length L1 of the first wall 12a1, at least one second rib 12b2 extending along the second length L2 of the second wall 12b1, and at least one third rib 12c6 extending along the third length L3 of the third wall 12c1.

Implementations can include wherein the door panel 12e including a plurality of tabs (e.g., first tab 12e3, second tab 12e4, third tab 12e5, fourth tab 12e6, fifth tab 12e7, and sixth tab 12e8), as the door panel 12e being in the at least one coupled position, at least one of the plurality of tabs (e.g., first tab 12e3, second tab 12e4, third tab 12e5, fourth tab 12e6, fifth tab 12e7, and sixth tab 12e8), being coupled to the at least one coupling area (e.g., first notch set 14 or second notch set 16) of the first wall 12a1 and at least one of the plurality of tabs (e.g., first tab 12e3, second tab 12e4, third tab 12e5, fourth tab 12e6, fifth tab 12e7, and sixth tab 12e8), being coupled to the at least one coupling area (e.g., although not shown, similar to first notch set 14 or second notch set 16) of the third wall 12c1.

Implementations can include the at least one coupling area (e.g., though not shown, similar to first notch set 14 or second notch set 16) of the first wall 12a1 including at least one pair of first and second notches (e.g., upper notch 14a and lower notch 14b) positioned on the door panel portion of the first wall 12a1, the first notch (e.g., upper notch 14a) being spaced from the second notch (e.g., lower notch 14b) along the second direction 10a2 and wherein the at least one coupling area (e.g., although not shown, similar to first notch set 14 or second notch set 16) of the third wall 12c1 includes at least one pair of first and second notches (e.g., although not shown, similar to upper notch 14a and lower notch 14b) positioned on the door panel portion of the third wall 12c1, the first notch (e.g., although not shown, similar to upper notch 14a) being spaced from the second notch (e.g., although not shown, similar to lower notch 14b) along the second direction 10a2.

Implementations can include the door panel 12e including a plurality of tabs (e.g., first tab 12e3, second tab 12e4, third tab 12e5, fourth tab 12e6, fifth tab 12e7, and sixth tab 12e8), and the second wall 12b1 including at least one coupling area (e.g., third notch set 18 or fourth notch set 20), as the door panel 12e being in the at least one coupled position, at least one of the plurality of tabs (e.g., at least of first tab 12e3, second tab 12e4, third tab 12e5, fourth tab 12e6, fifth tab 12e7, and sixth tab 12e8), being coupled to the at least one coupling area (e.g., third notch set 18 or fourth notch set 20) of the second wall 12b1.

Implementations can include the at least one coupling area (e.g., third notch set 18 or fourth notch set 20) of the second wall 12b1 including at least one pair of first and second notches (e.g., upper notch 18a and lower notch 18b) positioned on the door panel portion of the second wall 12b1, the first notch (e.g., upper notch 18a) being spaced from the second notch (e.g., lower notch 18b) along the second direction 10a2.

Implementations can further include a flexible portion 22b and wherein the door panel 12e is hingedly coupled to the second wall 12b1 by the flexible portion 22b.

Implementations can include the at least one coupled position of the door panel 12e including a first position wherein the door panel 12e being coupled to the first wall 12a1 and the third wall 12c1 with the interior surface 12e1 of the door panel 12e being parallel with the interior surface 12d1 of the shelf panel 12d and including a second position with the door panel 12e coupled to the first wall 12a1 and the third wall 12c1 with the interior surface 12e1 of the door panel 12e being parallel with the interior surface 12d1 of the shelf panel 12d, the first position of the door panel 12e being spaced from the second position of the door panel 12e along the second direction 10a2.

Implementations can further include a flexible hinge (e.g., hinge assembly 22) and wherein the door panel 12e is hingedly coupled to the second wall 12b1 by the flexible hinge (e.g., hinge assembly 22).

Implementations can include in the first position the interior surface 12e1 of the door panel 12e is in the same plane as the interior surface 12d1 of the shelf panel 12d and in the second position the interior surface 12e1 of the door panel 12e is in a plane different than the plane of the interior surface 12d1 of the shelf panel 12d.

Implementations can include the shelf panel length Ls of the shelf panel portion of the third wall 12c1 being less than one-half of the door panel length Ld of the door panel portion of the third wall 12c1.

Implementations can include the first wall 12a1 and the third wall 12c1 including a plurality of tabs, a first portion of the plurality of tabs (e.g., tab 12a3 and tab 12c3) extending over the interior surface 12d1 of the shelf panel 12d and a second portion of the plurality of tabs (e.g., tab 12a2 and tab 12c2) extending over the interior surface 12e1 of the door panel 12e as the door panel 12e is in the at least one coupled position.

As shown by one or more of FIGS. 1-27, implementations of a case assembly 10 for a tablet computer 110 and for a keyboard folio 120, the case assembly 10 including a frame 12 including a first wall 12a1 including a first length L1, a second wall 12b1 including a second length L2, and a third wall 12c1 including a third length L3, the first wall 12a1 extending along the first length L1 of the first wall 12a1 parallel to the third length L3 of the third wall 12c1, the first wall 12a1 extending along the first length L1 of the first wall 12a1 perpendicularly to the second length L2 of the second wall 12b1, the first wall 12a1 including at least one coupling area (e.g., though not shown, similar to first notch set 14 or second notch set 16), a door panel portion with a door panel length (e.g., though not shown, similar to door panel length Ld) and a shelf panel portion with a shelf panel length Ls, the third wall 12c1 including at least one coupling area (e.g., first notch set 14 or second notch set 16), a door panel portion with a door panel length Ld, and a shelf panel portion with a shelf panel length Ls; a door panel 12e including an interior surface 12e1 and an exterior surface 12e9, the door panel 12e positionable to be removably couplable to the at least one coupling area (e.g., though not shown, similar to first notch set 14 or second notch set 16) of the first wall 12a1 of the frame 12 and positionable to be removably couplable to the at least one coupling area (e.g., first notch set 14 or second notch set 16) of the third wall 12c1 of the frame 12, a shelf panel 12d including an interior surface 12d1 and an exterior surface 12d3, the shelf panel 12d coupled to the shelf panel portion of the first wall 12a1 of the frame 12, the shelf panel 12d coupled to the shelf panel portion of the third wall 12c1 of the frame 12, the shelf panel portion of the first wall 12a1 and the shelf panel portion of the third wall 12c1 extending perpendicularly to the interior surface 12*d*1 of the shelf panel 12*d* in a first direction 10*a*1, and the shelf panel portion of the first wall 12*a*1 and the shelf panel portion of the third wall 12*c*1 extending perpendicularly to the exterior surface 12*d*3 of the shelf panel 12*d* in a second direction 10*a*2, the first direction 10*a*1 being opposite of the second direction 10*a*2; and a hinge assembly 22 including a frame attachment 22*a*, a door panel attachment 22*c*, and a flexible portion 22*b*, the frame attachment 22*a* coupled to the second wall 12*b*1 of the frame 12, the door panel attachment 22*c* coupled to the exterior surface 12*e*9 of the door panel 12*e*, and the flexible portion 22*b* extending between the frame attachment 22*a* and the door panel attachment 22*c*, and the flexible portion 22*b* configured to provide adjustment of the door panel 12*e* between at least a first position and a second position of the door panel 12*e* wherein the exterior surface 12*e*9 of the door panel 12*e* is parallel to the exterior surface 12*d*3 of shelf panel 12*d* in both the first position and the second position of the exterior surface 12*d*3 and the exterior surface 12*e*9 of the door panel 12*e* is in different locations along the second direction 10*a*2 as the door panel 12*e* in the first position and the second position.

Implementations can include the door panel 12*e* being positioned to be couplable with the at least one coupling area (e.g., though not shown, similar to first notch set 14 or second notch set 16) of the first wall 12*a*1 of the frame 12 and to be couplable with the at least one coupling area (e.g., first notch set 14 or second notch set 16) of the third wall 12*c*1 of the frame 12 as the door panel 12*e* is in the first position and as the door panel 12*e* is in the second position.

As shown by one or more of FIGS. 1-27, implementations of a case assembly 10 for a tablet computer 110 and for a keyboard folio 120, the case assembly 10 including a frame 12 including a first wall 12*a*1 including a first length L1, a second wall 12*b*1 including a second length L2, and a third wall 12*c*1 including a third length L3, the first wall 12*a*1 extending along the first length L1 of the first wall 12*a*1 parallel to the third length L3 of the third wall 12*c*1, the first wall 12*a*1 extending along the first length L1 of the first wall 12*a*1 perpendicularly to the second length L2 of the second wall 12*b*1, the first wall 12*a*1 including at least one coupling area (e.g., though not shown, similar to first notch set 14 or second notch set 16), a door panel portion with a door panel length (e.g., though not shown, similar to door panel length Ld), and a shelf panel portion with a shelf panel length Ls, the third wall 12*c*1 including at least one coupling area (e.g., first notch set 14 or second notch set 16), a door panel portion with a door panel length Ld and a shelf panel portion with a shelf panel length Ls; a door panel 12*e* including an interior surface 12*e*1 and an exterior surface 12*e*9, the door panel 12*e* positionable to be removably couplable to the at least one coupling area (e.g., though not shown, similar to first notch set 14 or second notch set 16) of the first wall 12*a*1 of the frame 12 and removably couplable to the at least one coupling area (e.g., first notch set 14 or second notch set 16) of the third wall 12*c*1 of the frame 12, a shelf panel 12*d* including an interior surface 12*d*1 and an exterior surface 12*d*3, the shelf panel 12*d* coupled to the shelf panel portion of the first wall 12*a*1 of the frame 12, the shelf panel 12*d* coupled to the shelf panel portion of the third wall 12*c*1 of the frame 12, the shelf panel portion of the first wall 12*a*1 and the shelf panel portion of the third wall 12*c*1 extending perpendicularly to the interior surface 12*d*1 of the shelf panel 12*d* in a first direction 10*a*1, and the shelf panel portion of the first wall 12*a*1 and the shelf panel portion of the third wall 12*c*1 extending perpendicularly to the exterior surface 12*d*3 of the shelf panel 12*d* in a second direction 10*a*2, the first direction 10*a*1 being opposite of the second direction 10*a*2; and a flexible portion 22*b* flexibly coupling the door panel 12*e* to the second wall 12*b*1 of the frame 12 to provide adjustment of the door panel 12*e* between at least a first position and a second position of the door panel 12*e* wherein the exterior surface 12*e*9 of the door panel 12*e* being parallel to the exterior surface 12*d*3 of shelf panel 12*d* in both the first position and the second position of the door panel 12*e*, and wherein the exterior surface 12*e*9 of the door panel 12*e* is in different locations along the second direction 10*a*2 in the first position and the second position of the door panel 12*e*.

Implementations can include the door panel 12*e* positioned to be couplable with the at least one coupling area (e.g., though not shown, similar to first notch set 14 or second notch set 16) of the first wall 12*a*1 of the frame 12 and to be couplable with the at least one coupling area (e.g., first notch set 14 or second notch set 16) of the third wall 12*c*1 of the frame 12 as the door panel 12*e* being in the first position and as the door panel 12*e* being in the second position.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B."

With respect to the appended claims, those skilled in the art will appreciate that recited operations therein may generally be performed in any order. Also, although various operational flows are presented in a sequence(s), it should be understood that the various operations may be performed in other orders than those which are illustrated, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

What is claimed is:

1. A case assembly for a tablet computer and for a keyboard folio, the case assembly comprising:
(I) a frame including
  (A) a first wall including a first length,
  (B) a second wall including a second length, and
  (C) a third wall including a third length,
    (i) the first wall extending along the first length of the first wall parallel to the third length of the third wall,
    (ii) the first wall extending along the first length of the first wall perpendicularly to the second length of the second wall,
    (iii) the first wall including
      (a) at least one coupling area,
      (b) a door panel portion with a door panel length, and
      (c) a shelf panel portion with a shelf panel length,
    (iv) the third wall including
      (a) at least one coupling area,
      (b) a door panel portion with a door panel length and
      (c) a shelf panel portion with a shelf panel length;
(II) a door panel including
  (A) an interior surface and
  (B) an exterior surface,
    (i) the door panel
      (a) positionable to be removably couplable to the at least one coupling area of the first wall of the frame and
      (b) positionable to be removably couplable to the at least one coupling area of the third wall of the frame
      (c) wherein as the door panel being in at least one coupled position, the door panel
        being coupled to the at least one coupling area of the first wall of the frame and
        being coupled to the at least one coupling area of the third wall of the frame, and
      (d) wherein as the door panel being in at least one uncoupled position, the door panel
        being uncoupled from the at least one coupling area of the first wall of the frame and
        being uncoupled from the at least one coupling area of the third wall of the frame,
    (ii) as the door panel being in the at least one coupled position, the door panel positioned
      to extend alongside of the door panel length of the door panel portion of the first wall and
      to extend alongside of the door panel length of the door panel portion of the third wall,
    (iii) as the door panel being in the at least one coupled position,
      the door panel portion of the first wall extending perpendicularly to the interior surface of the door panel in a first direction, and
      and the door panel portion of the third wall extending perpendicularly to the interior surface of the door panel in a first direction,
    (iv) as the door panel being in the at least one coupled position,
      the door panel portion of the first wall extending perpendicularly to the exterior surface of the door panel in a second direction, and
      the door panel portion of the third wall extending perpendicularly to the exterior surface of the door panel in a second direction,
      the first direction being opposite of the second direction; and
(III) a shelf panel including
  (A) an interior surface and
  (B) an exterior surface,
    (i) the shelf panel coupled to the shelf panel portion of the first wall of the frame,
    (ii) the shelf panel coupled to the shelf panel portion of the third wall of the frame,
    (iii) the shelf panel portion of the first wall extending perpendicularly to the interior surface of the shelf panel in the first direction,
    (iv) the shelf panel portion of the third wall extending perpendicularly to the interior surface of the shelf panel in the first direction,
    (v) the shelf panel portion of the first wall extending perpendicularly to the interior surface of the shelf panel in the first direction, and
    (vi) the shelf panel portion of the third wall extending perpendicularly to the exterior surface of the shelf panel in the second direction.

2. The case assembly of claim 1 wherein as the door panel being in the at least one coupled position, the second wall extending perpendicularly to the interior surface of the door panel in the first direction and the second wall extending perpendicularly to the exterior surface of the door panel in the second direction.

3. The case assembly of claim 1 further comprising a hinge assembly, the hinge assembly including a frame attachment, a door panel attachment, and a flexible portion, the frame attachment coupled to the second wall of the frame, the door panel attachment coupled to the exterior surface of the door panel, and the flexible portion extending between the frame attachment and the door panel attachment.

4. The case assembly of claim 3 wherein the hinge assembly includes a hinge length, the hinge length of the hinge assembly being at least one-half the second length of the second wall.

5. The case assembly of claim 3 wherein the flexible portion of the hinge assembly being foldable and flattenable to allow for desired positioning of the door panel.

6. The case assembly of claim 1 further comprising at least one first rib extending along the first length of the first wall, at least one second rib extending along the second length of the second wall, and at least one third rib extending along the third length of the third wall.

7. The case assembly of claim 1 wherein the door panel includes a plurality of tabs, as the door panel being in the at least one coupled position, at least one of the plurality of tabs, being coupled to the at least one coupling area of the first wall and at least one of the plurality of tabs, being coupled to the at least one coupling area of the third wall.

8. The case assembly of claim 7 wherein the at least one coupling area of the first wall includes at least one pair of first and second notches positioned on the door panel portion of the first wall, the first notch being spaced from the second notch along the second direction and wherein the at least one coupling area of the third wall includes at least one pair of first and second notches positioned on the door panel portion of the third wall, the first notch being spaced from the second notch along the second direction.

9. The case assembly of claim 1 wherein the door panel includes a plurality of tabs, and the second wall includes at least one coupling area, as the door panel being in the at least one coupled position, at least one of the plurality of tabs, being coupled to the at least one coupling area of the second wall.

10. The case assembly of claim 9 wherein the at least one coupling area of the second wall includes at least one pair of first and second notches positioned on the door panel portion of the second wall, the first notch being spaced from the second notch along the second direction.

11. The case assembly of claim 10 further comprising a flexible portion and wherein the door panel being hingedly coupled to the second wall by the flexible portion.

12. The case assembly of claim 1 wherein the at least one coupled position of the door panel includes a first position wherein the door panel being coupled to the first wall and the third wall with the interior surface of the door panel being parallel with the interior surface of the shelf panel and includes a second position with the door panel coupled to the first wall and the third wall with the interior surface of the door panel being parallel with the interior surface of the shelf panel, the first position of the door panel being spaced from the second position of the door panel along the second direction.

13. The case assembly of claim 12 further comprising a flexible hinge and wherein the door panel being hingedly coupled to the second wall by the flexible hinge.

14. The case assembly of claim 12 wherein in the first position the interior surface of the door panel being in the same plane as the interior surface of the shelf panel and in the second position the interior surface of the door panel being in a plane different than the plane of the interior surface of the shelf panel.

15. The case assembly of claim 1 wherein the shelf panel length of the shelf panel portion of the third wall being less than one-half of the door panel length of the door panel portion of the third wall.

16. The case assembly of claim 1 wherein the first wall and the third wall include a plurality of tabs, a first portion of the plurality of tabs extending over the interior surface of the shelf panel and a second portion of the plurality of tabs extending over the interior surface of the door panel as the door panel being in the at least one coupled position.

17. A case assembly for a tablet computer and for a keyboard folio, the case assembly comprising:
(I) a frame including
  (A) a first wall including a first length,
  (B) a second wall including a second length, and
  (C) a third wall including a third length,
    (i) the first wall extending along the first length of the first wall parallel to the third length of the third wall,
    (ii) the first wall extending along the first length of the first wall perpendicularly to the second length of the second wall,
    (iii) the first wall including at least
      (a) one coupling area,
      (b) a door panel portion with a door panel length, and
      (c) a shelf panel portion with a shelf panel length,
    (iv) the third wall including
      (a) at least one coupling area,
      (b) a door panel portion with a door panel length, and
      (c) a shelf panel portion with a shelf panel length;
(II) a door panel including
  (A) an interior surface and
  (B) an exterior surface,
    (i) the door panel
      (a) positionable to be removably couplable to the at least one coupling area of the first wall of the frame and
      (b) positionable to be removably couplable to the at least one coupling area of the third wall of the frame,
(III) a shelf panel including
  (A) an interior surface and
  (B) an exterior surface,
    (i) the shelf panel coupled to the shelf panel portion of the first wall of the frame,
    (ii) the shelf panel coupled to the shelf panel portion of the third wall of the frame,
    (iii) the shelf panel portion of the first wall and the shelf panel portion of the third wall extending perpendicularly to the interior surface of the shelf panel in a first direction, and
    (iv) the shelf panel portion of the first wall and the shelf panel portion of the third wall extending perpendicularly to the exterior surface of the shelf panel in a second direction,
    (v) the first direction being opposite of the second direction; and
(IV) a hinge assembly including
  (A) a frame attachment,
  (B) a door panel attachment, and
  (C) a flexible portion,
    (i) the frame attachment coupled to the second wall of the frame,
    (ii) the door panel attachment coupled to the exterior surface of the door panel, and
    (iii) the flexible portion extending between the frame attachment and the door panel attachment, and
    (iv) the flexible portion configured to provide adjustment of the door panel between at least a first position and a second position of the door panel wherein
      the exterior surface of the door panel being parallel to the exterior surface of shelf panel in both the first position and the second position of the exterior surface, and the exterior surface of the door panel being in different locations along the second direction as the door panel being in the first position and the second position.

18. The case assembly of claim 17 wherein the door panel being positioned to be couplable with the at least one coupling area of the first wall of the frame and to be couplable with the at least one coupling area of the third wall of the frame as the door panel being in the first position and as the door panel being in the second position.

19. A case assembly for a tablet computer and for a keyboard folio, the case assembly comprising:

(I) a frame including
  (A) a first wall including a first length,
  (B) a second wall including a second length, and
  (C) a third wall including a third length,
    (i) the first wall extending along the first length of the first wall parallel to the third length of the third wall,
    (ii) the first wall extending along the first length of the first wall perpendicularly to the second length of the second wall,
    (iii) the first wall including at least
      (a) one coupling area,
      (b) a door panel portion with a door panel length, and
      (c) a shelf panel portion with a shelf panel length,
    (iv) the third wall including
      (a) at least one coupling area,
      (b) a door panel portion with a door panel length, and
      (c) a shelf panel portion with a shelf panel length;
(II) a door panel including
  (A) an interior surface and
  (B) an exterior surface,
    (i) the door panel
      (a) positionable to be removably couplable to the at least one coupling area of the first wall of the frame and
      (b) removably couplable to the at least one coupling area of the third wall of the frame,
(III) a shelf panel including
  (A) an interior surface and
  (B) an exterior surface,
    (i) the shelf panel coupled to the shelf panel portion of the first wall of the frame,
    (ii) the shelf panel coupled to the shelf panel portion of the third wall of the frame,
    (iii) the shelf panel portion of the first wall and the shelf panel portion of the third wall extending perpendicularly to the interior surface of the shelf panel in a first direction, and
    (iv) the shelf panel portion of the first wall and the shelf panel portion of the third wall extending perpendicularly to the exterior surface of the shelf panel in a second direction,
    (v) the first direction being opposite of the second direction; and
(IV) a flexible portion flexibly coupling the door panel to the second wall of the frame to provide adjustment of the door panel between at least a first position and a second position of the door panel wherein the exterior surface of the door panel being parallel to the exterior surface of shelf panel in both the first position and the second position of the door panel, and wherein the exterior surface of the door panel being in different locations along the second direction in the first position and the second position of the door panel.

20. The case assembly of claim 19 wherein the door panel positioned to be couplable with the at least one coupling area of the first wall of the frame and to be couplable with the at least one coupling area of the third wall of the frame as the door panel being in the first position and as the door panel being in the second position.

\* \* \* \* \*